United States Patent
Sharma et al.

(10) Patent No.: US 12,289,249 B2
(45) Date of Patent: Apr. 29, 2025

(54) VIRTUAL ROUTER DEPLOYMENT AND CONFIGURATION

(71) Applicant: Juniper Networks, Inc., Sunnyvale, CA (US)

(72) Inventors: Shailender Sharma, Bangalore (IN); Vinod Nair, San Jose, CA (US); Kiran K N, Bangalore (IN); Kirankumar Kashinath Raikar, Bangalore (IN); Rakesh Kumar Reddy Varimalla, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/334,979

(22) Filed: Jun. 14, 2023

(65) Prior Publication Data
US 2024/0422107 A1 Dec. 19, 2024

(51) Int. Cl.
*H04L 47/762* (2022.01)
*H04L 41/0816* (2022.01)
(Continued)

(52) U.S. Cl.
CPC ........ *H04L 47/762* (2013.01); *H04L 41/0816* (2013.01); *H04L 47/781* (2013.01); *H04W 40/28* (2013.01)

(58) Field of Classification Search
CPC . H04L 47/762; H04L 41/0816; H04L 47/781; H04W 40/28
(Continued)

(56) References Cited

U.S. PATENT DOCUMENTS

| 9,571,394 | B1 | 2/2017 | Sivaramakrishnan et al. |
| 10,263,832 | B1 * | 4/2019 | Ghosh ................. H04L 43/0823 |

(Continued)

FOREIGN PATENT DOCUMENTS

| EP | 2859694 A1 | 4/2015 |
| EP | 3675423 A1 | 7/2020 |

(Continued)

OTHER PUBLICATIONS

"Kubernetes Custom Resource Definition CRD", Github, Feb. 11, 2020, 8 pp.
(Continued)

*Primary Examiner* — Nicholas R Taylor
*Assistant Examiner* — Chong G Kim
(74) *Attorney, Agent, or Firm* — Shumaker & Sieffert, P.A.

(57) ABSTRACT

In general, techniques are described for deploying and managing a virtual router having Data Plane Development Kit (DPDK) functionality to a computing device. In an example, a method includes creating, by a container orchestration platform executing on a computing device, a virtual router custom resource instance of a virtual router custom resource definition, the virtual router custom resource instance for a virtual router to execute on the computing device; based on configuration data for the virtual router custom resource instance, by the container orchestration platform, modifying the virtual router custom resource instance with the configuration data and deploying a first virtual computing instance comprising a virtual router configured according to the modified virtual router custom resource instance; and executing, by the computing device, the virtual router to process a packet.

20 Claims, 7 Drawing Sheets

(51) Int. Cl.
*H04L 47/78* (2022.01)
*H04W 40/28* (2009.01)

(58) Field of Classification Search
USPC .......................................................... 709/226
See application file for complete search history.

(56) References Cited

U.S. PATENT DOCUMENTS

| | | | |
|---|---|---|---|
| 10,708,082 B1* | 7/2020 | Bakiaraj | H04L 45/586 |
| 11,575,572 B2 | 2/2023 | Nagaprakash et al. | |
| 2018/0006935 A1* | 1/2018 | Mutnuru | H04L 45/42 |
| 2019/0394081 A1* | 12/2019 | Tahhan | H04L 41/122 |
| 2020/0076685 A1* | 3/2020 | Vaidya | G06F 9/44526 |
| 2020/0213227 A1 | 7/2020 | Pianigiani et al. | |
| 2020/0244577 A1* | 7/2020 | Gasparakis | H04L 45/74 |
| 2020/0314015 A1* | 10/2020 | Mariappan | H04L 41/0895 |
| 2020/0344147 A1* | 10/2020 | Pianigiani | H04L 12/4625 |
| 2021/0218652 A1 | 7/2021 | Raut et al. | |
| 2021/0218750 A1* | 7/2021 | Wells | G06F 9/541 |
| 2021/0314239 A1* | 10/2021 | Shen | G06F 9/54 |
| 2021/0314388 A1* | 10/2021 | Zhou | H04L 12/66 |
| 2022/0035651 A1* | 2/2022 | Maurya | G06F 9/547 |
| 2022/0038311 A1* | 2/2022 | Shen | H04L 63/0263 |
| 2022/0158926 A1* | 5/2022 | Wennerstr?m | H04L 41/0853 |
| 2022/0229678 A1* | 7/2022 | Beard | G06F 9/45558 |
| 2022/0278927 A1 | 9/2022 | Mariappan et al. | |
| 2022/0279420 A1 | 9/2022 | Akkipeddi et al. | |
| 2022/0279421 A1* | 9/2022 | Sivakumar | H04L 45/586 |
| 2022/0329651 A1* | 10/2022 | Kim | H04L 67/1008 |

FOREIGN PATENT DOCUMENTS

| | | |
|---|---|---|
| EP | 3731466 A1 | 10/2020 |
| WO | 20130184846 A1 | 12/2013 |

OTHER PUBLICATIONS

Kn et al., "Day One: Contrail Dpdk vROUTER", Engineering Simplicity, Juniper Networks, Jan. 21, 2021, 196 pp., URL: https://www.juniper.net/documentation/en_US/day-one-books/contrail-DPDK.pdf.

Kubernetes, "Assign CPU Resources to Containers and Pods", Mar. 30, 2023, 6 pp., URL: https://kubernetes.io/docs/tasks/configure-pod-container/assign-cpu-resource/.

Kubernetes, "Control CPU Management Policies on the Node", May 22, 2023, 5 pp., URL: https://kubernetes.io/docs/tasks/administer-cluster/cpu-management-policies/.

Rosen et al., "BGP/MPLS IP Virtual Private Networks (VPNs)", Network Working Group, Feb. 1, 2006, 47 pp., URL: https://www.rfc-editor.org/rfc/pdfrfc/rfc4364.txt.pdf.

U.S. Appl. No. 18/147,599, filed Dec. 28, 2022, naming inventors Henkel et al.

* cited by examiner

VIRTUAL ROUTER DEPLOYMENT AND CONFIGURATION

TECHNICAL FIELD

The disclosure relates to a virtualized computing infrastructure and, more specifically, to deploying a virtual router compute nodes of a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual computing instances, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are light-weight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for deploying and managing a virtual router having Data Plane Development Kit (DPDK) functionality to a computing device. The virtual router is a DPDK-based virtual router such that packets sourced by or destined to other containers executing on the computing device may be exchanged between containers of a pod and the virtual router in user space, bypassing the kernel of the computing device hosting the pod and the virtual router.

The DPDK-enabled virtual router may execute simultaneously with other DPDK applications, which if not addressed can lead to conflicts for resources of a computing device, such as processing units (e.g., CPUs) and Peripheral Component Interconnect identifiers (PCI IDs) for virtual functions. The other DPDK applications may include functions of a mobile network, such as distributed units (DUs) or central units (CUs), having high resource and service level demands for which resource conflicts can be particularly degrading to performance. Components of the computing device, such as a container orchestration platform executed by the computing device, may leverage a virtual router custom resource to allocate instances of at least one resource of the computing device among the virtual computing instances that execute the DPDK-enabled virtual router and other applications, respectively.

In one aspect as described herein for addressing potential CPU conflict, the virtual router obtains a CPU allocation from an orchestrator-based CPU manager, which also determines and assigns the CPU allocation for the other DPDK applications. In another aspect as described herein for addressing potential CPU conflict, the virtual router may reserve and exclude some CPUs from the orchestrator-based CPU manager and use those reserved CPUs via an input from a virtual router custom resource. As these CPUs are excluded from the CPU manager allocation pool, the other DPDK applications requesting the CPU from the CPU manager will be assigned non-excluded CPUs.

In some aspects, the techniques implemented by the virtual router include avoiding PCI ID conflicts with other DPDK workloads. In general, when a DPDK application starts, during Environment Abstraction Layer initialization, the DPDK application checks for what interfaces are already bound to VFIO or uio_pci_generic, and EAL initialization will be done for these interfaces whether or not the interfaces are used. Accordingly, if two DPDK applications are running, they will conflict with each other's PCI addresses as both may attempt try to initialize the same interfaces. To avoid such issues, the virtual router of some aspects described herein receives interface names as user input from a configuration via a custom resource, and the DPDK driver obtains the corresponding PCI IDs for the corresponding interfaces that are intended to be owned by the virtual router, and the DPDK driver then passes these via a PCI whitelist option to the virtual router. For other DPDK applications (i.e., not the virtual router), these PCI IDs can be excluded from the SR-IOV configuration map, and DPDK applications only request from the pool reserved for the application pods (i.e., the pool of PCI IDs excluding those reserved for the virtual router). For aspects in which this is configurable, where the virtual router may run independently as the only DPDK application on the computing device, all interfaces may be available.

In some aspects, the techniques include an application package for deployment and a control flow for configuring and deploying a virtual router using a computing device-based orchestrator and a custom resource. The custom resource for virtual router configuration may include configuration elements conventionally exposed by a physical or virtual router, but the configuration elements may be consolidated along with Kubernetes native/built-in resources to support a unified intent model that is realized by Kubernetes controllers and by custom resource controller(s) that work to reconcile the actual state of the virtual router with the intended state. The application package for the virtual router and provided to the orchestrator, executing on the computing device, includes a deployer pod to create the virtual router custom resource definition (CRD) with the orchestrator, which then (1) monitors and reconciles the virtual router custom resource instance on configuration changes, and (2) deploys (including redeploying/restarting) the virtual router pod that includes those containers used to implement the virtual router with the requested configurations. As a result, the techniques provide a technical improvement in that the administrator for the network or a distributed application, when performing virtual router deployment and configuration, is able to rely on a cloud-native framework that leverages an orchestrator interface to simplify configuring or reconfiguring a virtual router, even for configurations that must occur at virtual router initialization.

In some aspects, the techniques include using orchestrator probing to facilitate virtual router data plane monitoring and corrective actions, where the virtual router exposes its own internal state tracking via endpoints (e.g., HTTP REST endpoints). The same endpoint may be used for different types of corrective actions, depending on the probe response provided by the virtual router. As a result, the techniques provide a technical improvement in that the orchestrator, also executing with the virtual router on the computing device, can take corrective actions within the computing device itself, which may for example reduce the latency of necessary restarts of the virtual router containers and have other advantages over conventional monitoring techniques.

In an example, a computing device comprises processing circuitry in communication with a storage device, the processing circuitry configured to execute a container orchestration platform, wherein the container orchestration platform is configured to: create a virtual router custom resource instance of a virtual router custom resource definition, the virtual router custom resource instance for a virtual router to execute on the computing device, and based on configuration data for the virtual router custom resource instance, modify the virtual router custom resource instance with the configuration data and deploy a first virtual computing instance comprising a virtual router configured according to the modified virtual router custom resource instance; and wherein the processing circuitry is configured to execute the virtual router to process a packet.

In an example, a method includes creating, by a container orchestration platform executing on a computing device, a virtual router custom resource instance of a virtual router custom resource definition, the virtual router custom resource instance for a virtual router to execute on the computing device; based on configuration data for the virtual router custom resource instance, by the container orchestration platform, modifying the virtual router custom resource instance with the configuration data and deploying a first virtual computing instance comprising a virtual router configured according to the modified virtual router custom resource instance; and executing, by the computing device, the virtual router to process a packet.

In an example, a non-transitory computer readable storage medium comprising instructions for causing processing circuitry of a computing device to: execute a container orchestration platform; create, by a container orchestration platform, a virtual router custom resource instance of a virtual router custom resource definition, the virtual router custom resource instance for a virtual router to execute on the computing device; based on configuration data for the virtual router custom resource instance, by the container orchestration platform, modify the virtual router custom resource instance with the configuration data and deploying a first virtual computing instance comprising a virtual router configured according to the modified virtual router custom resource instance; and execute the virtual router to process a packet.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
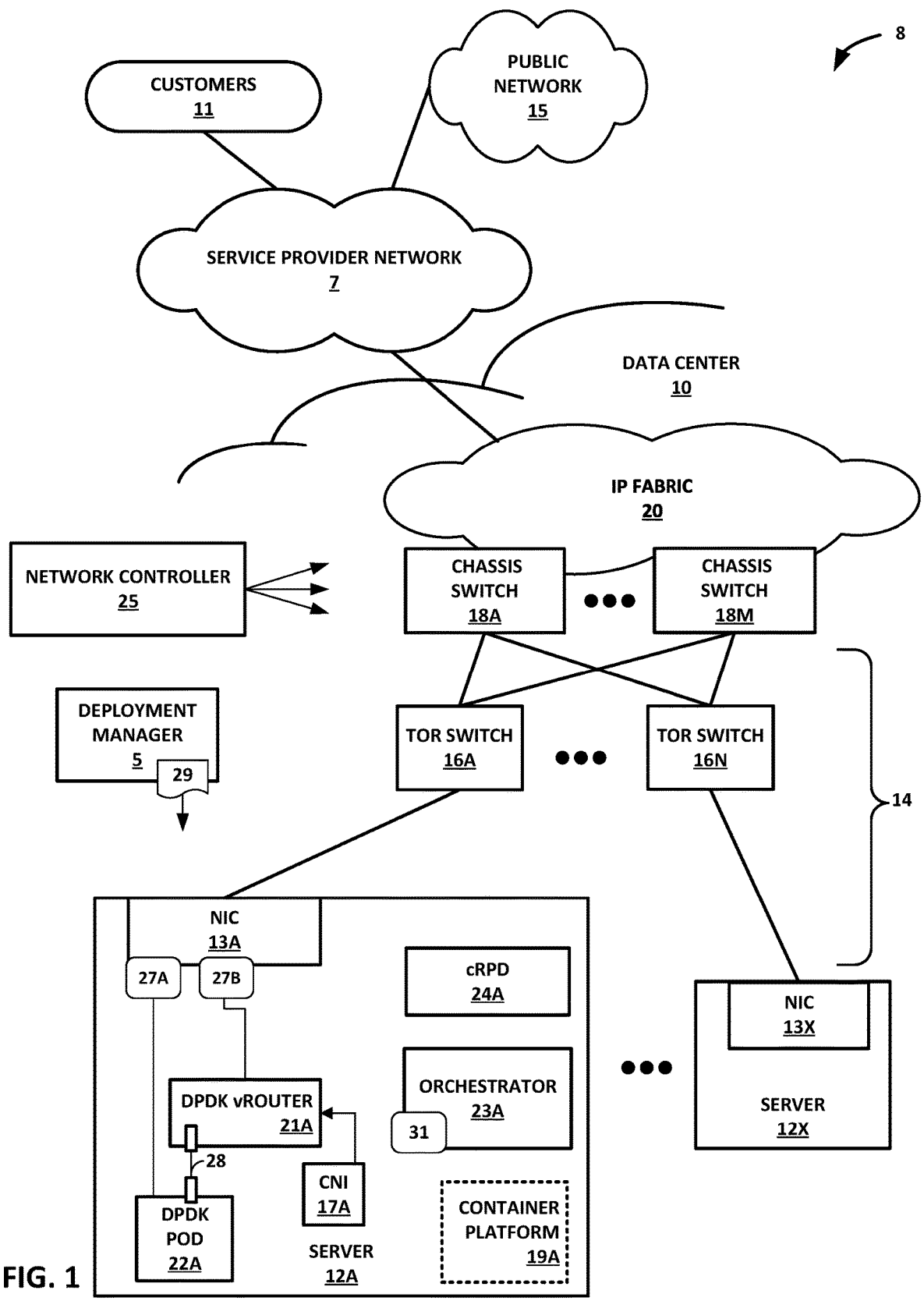
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for customer sites 11 (illustrated as "customers 11") having one or more customer networks coupled to the data center by service provider network 107. Data center 10 may, for example, host infrastructure equipment, such as networking and storage systems, redundant power supplies, and environmental controls. Service provider network 107 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 107, an enterprise IP network, or some combination thereof.

Although customer sites 11 and public network 15 are illustrated and described primarily as edge networks of service provider network 107, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 107 offers packet-based connectivity to attached customer sites 11, data center 10, and public network 15. Service provider network 107 may represent a network that is owned and operated by a service provider to interconnect a plurality of networks. Service provider network 107 may implement Multi-Protocol Label Switching (MPLS) forwarding and in such instances may be referred to as an MPLS network or MPLS backbone. In some instances, service provider network 107 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within a core of service provider network 7.

In this example, data center 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10. In addition, other servers of servers 12 include components similar to those shown in detail only with respect to server 12A.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 107. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 107. The switching architecture of data center 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual computing instances by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual computing instances, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual computing instances (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual computing instance present on the server 12.)

The control plane protocol between the control plane nodes of the network controller 25 or a physical gateway router (or switch) may be BGP (and may be Netconf for management). This is the same control plane protocol may also be used for MPLS L3VPNs and MPLS EVPNs. The protocol between the network controller 25 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 107, may underlay the one or more virtual networks.

Each of servers 12 may host one or more virtual computing instances each having at least one virtual network endpoint for one or more virtual networks configured in the physical network. A virtual network endpoint for a virtual network may represent one or more virtual computing instances that share a virtual network interface for the virtual network. For example, a virtual network endpoint may be a virtual machine, a set of one or more containers (e.g., a pod), or another other virtual computing instance(s), such as a layer 3 endpoint for a virtual network. The term "virtual computing instance" encompasses virtual machines, containers, and other virtualized computing resources that provide an at least partially independent execution environment for applications. The term "virtual computing instance" encompasses a pod of one or more containers. As shown in FIG. 1, server 12A hosts one virtual network endpoint in the form of pod 22A having one or more containers. However, a server 12 may execute as many virtual computing instances as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "DPDK vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Virtual router 21A is a Data Plane Development Kit (DPDK)-enabled virtual router. That is, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example, but also DPDK-enabled pod 22A ("DPDK pod 22A")) that fully manages the NIC 13. This includes packets polling, packets processing, and packets forwarding. User packet processing steps may be performed by the virtual router 21A DPDK data plane with limited or no participation by the kernel (kernel not shown in FIG. 1).

The nature of this "polling mode" makes the virtual router 21A DPDK data plane packet processing/forwarding much more efficient as compared to the interrupt mode, particularly when the packet rate is high. There are limited or no interrupts and context switching during packet I/O.

Additional details of an example of a DPDK vRouter are found in "DAY ONE: CONTRAIL DPDK vROUTER," 2021, by Kiran K N et al., Juniper Networks, Inc., which is incorporated by reference herein in its entirety.

Computing infrastructure 8 implements deployment manager 5 for automating deployment of virtual computing instances across servers 12 to provide virtualized infrastructure for executing application workloads and services. In some examples, the platform may communicate with one or more container orchestration platforms that provide a container-centric infrastructure for automating deployment, scaling, and operations of containers to provide a container-centric infrastructure. "Orchestration," in the context of a virtualized computing infrastructure generally refers to provisioning, scheduling, and managing virtual computing instances and/or applications and services executing on such virtual computing instances to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Each of servers 12 executes a different one of orchestrators 23. For instance, server 12A executes orchestrator 23A and server 12X executes orchestrator 23X (not shown in FIG. 1). In some scenarios, this may be common and can be deployed on all servers of a cluster from one server that has reachability to an orchestrator API server, e.g., from a master node.

In general, deployment manager 5 defines, deploys, and upgrades applications using an application package that is to be deployed to and runs on any one or more of servers 12. Deployment manager 5 may be an instance of Helm. In general, an application package is a collection of files that describe one or more resources available via the container orchestration platform. The Helm deployment manager, for example, uses a package definition known as a Helm chart to describe a related set of Kubernetes resources. The application package can include:

A package definition containing information about the package.
One or more template files ("templates") that each includes variables.
One or more values files having values for variables of the templates.

Deployment manager 5 can combine a template with a values file to generate a manifest file that describes each component or resource of the application to be deployed, as well as the intended state of the cluster once the manifest is applied to the cluster. A manifest file can be YAML-formatted resource descriptions that is understood by the container orchestration platform, e.g., Kubernetes. In this way, deployment manager 5 may generate a manifest file for any of virtual routers 21, for use by the corresponding orchestrator 23 to deploy and configure the virtual router 21 on its server 12.

Elements of the automation platform of computing infrastructure 8 include at least servers 12, orchestrators 23, network controller 25, and deployment manager 5. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Network controller 25 may be distributed or centralized and may execute on one or more servers 12, or on other servers or a physical appliance. Network controller 25 may implement respective master nodes for one or more clusters each having one or more minion nodes implemented by respective servers 12 (also referred to as "compute nodes"). In general, network controller 25 controls the network configuration of the data center 10 fabric to, e.g., establish one or more virtual networks for packetized communications among virtual network endpoints. Network controller 25 provides a logically and in some cases physically centralized controller for facilitating operation of one or more virtual networks within data center 10. In some examples, network controller 25 may operate in response to configuration input received from any of orchestrators 23 and/or an administrator/operator. Additional information regarding network controller 25 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein.

In general, orchestrators 23 control the deployment, scaling, and operations of containers on respective servers 12 and provide virtualized computing infrastructure, which may include container-centric computing infrastructure. Orchestrators 23 may each implement a cluster master for a Kubernetes cluster made up of the corresponding server 12. As an example, Kubernetes is a container management platform that provides portability across public and private clouds, each of which may provide virtualization infrastructure to the container management platform. Example components of a Kubernetes orchestration system are described below with respect to FIG. 3. In some scenarios however, which may be combined with various aspects of the techniques described herein, a single orchestrator 23 is used for all servers 12 of the cluster. The choice of an orchestrator per-server or an orchestrator per-cluster can be based on the needs of a customer deploying the solution.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23A to obtain and host, in server 12A, containers. Container platform 19A obtains and executes the containers. Container platform 19A may be a DOCKER engine, APACHE MESOS containerizer, or other platform.

Container platform 19A includes a container network interface (CNI) 17A that configures virtual network interfaces for virtual network endpoints. Orchestrator 23A and container platform 19A uses CNI 17A to manage networking for pods, including pod 22A. For example, the CNI 17A creates virtual network interfaces to connect pods to virtual router 21A and enable containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 25 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 25 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 202A.

CNI 17A may be invoked by orchestrator 23A. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22A includes a containerized DPDK workload that is designed to use DPDK to accelerate packet processing, e.g., by exchanging data with other components using DPDK libraries. Additional description of interface configuration for a DPDK pod is found in U.S. Patent Publication No. 2022/0278927, published 1 Sep. 2023 and titled "DATA INTERFACES WITH ISOLATION FOR CONTAINERS DEPLOYED TO COMPUTE NODES," which is incorporated by reference herein in its entirety.

Pod 22A is configured with a data interface 28 that is used for high-throughput packet processing, more specifically, for sending and receiving packets with virtual router 21A for high-throughput applications. DPDK vRouter and DPDK pod 22A may have a separate management interface (not shown). Pod 22A may implement the management interface as an Ethernet interface (e.g., named "eth0"), while virtual router 21A may implement the management interface as a tap interface, virtio-user interface, or other type of interface.

Figure 5:
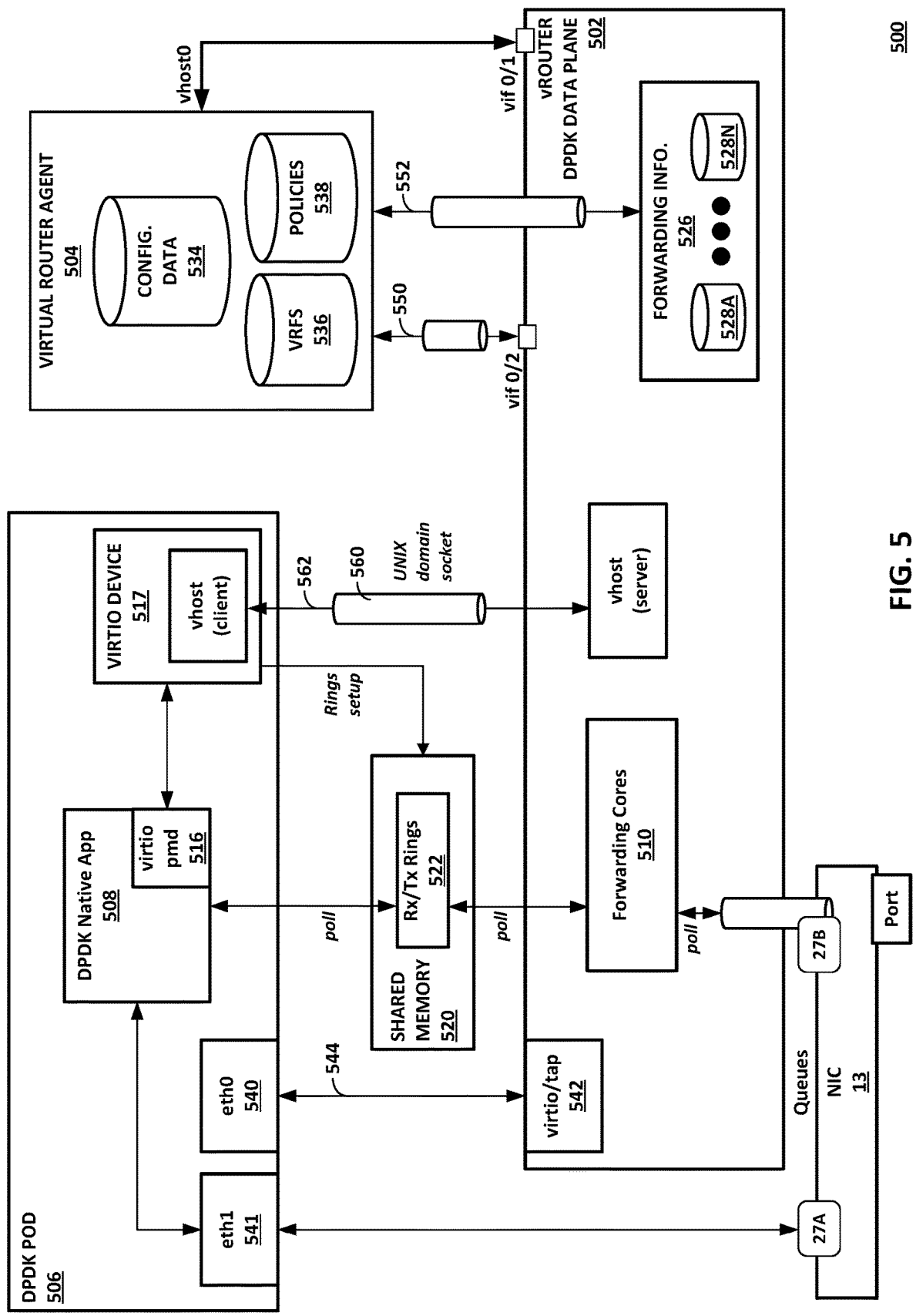
FIG. 5 is a block diagram illustrating an example computing device having a DPDK-based virtual router and a separate containerized DPDK workload, according to one or more aspects of this disclosure.

Pod 22A and virtual router 21A exchange data packets using data interface 28. Data interface 28 may be a DPDK interface. Pod 22A and virtual router 21A may set up data interface 28 using vhost. Pod 22A may operate according to an aggregation model. Pod 22A may use a virtual device, such as a virtio device with a vhost-user adapter, for user space container inter-process communication for data interface 28. An example is illustrated in FIG. 5, where virtio in this example may be a shared memory-based solution for exchanging packets with virtual router 21A. The shared memory may be huge pages initialized in DPDK and managed by the virtio device. The workload of pod 22A is thus built on DPDK and operates data interface 28 using DPDK. Pod 22A and virtual router 21A may bring up DPDK interfaces using vhost. Pod 22A may operate as a vhost server in some examples, with virtual router 21A as the vhost client, for setting up a DPDK interface. Virtual router 21A may operate as a vhost server in some examples, with pod 22A as the vhost client, for setting up a DPDK interface.

CNI 17A may configure, for pod 22A, in conjunction with one or more other components shown in FIG. 1, data interface 28. As noted above, these may be different types of interfaces. Data interface 28 may be referred to herein as a virtual network interface. Other example types of virtual network interfaces are described below. Any of the containers of the pod 22A may utilize, i.e., share, any virtual network interface of pod 22A.

A virtual network interface may represent a virtual ethernet ("veth") pair, where each end of the pair is a separate device (e.g., a Linux/Unix device), with one end of the pair assigned to pod 22A and one end of the pair assigned to virtual router 21A. The veth pair or an end of a veth pair are sometimes referred to as "ports". A virtual network interface may represent a macvlan network with media access control (MAC) addresses assigned to the pod 22A and to the virtual router 21A for communications between containers of pod 22A and virtual router 21A. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22A is a virtual network endpoint in one or more virtual networks. Orchestrator 23A may store or otherwise manage configuration data for application deployments that specifies a virtual network and specifies that pod 22A (or the one or more containers therein) is a virtual network endpoint of the virtual network. Orchestrator 2A3 may receive the configuration data from deployment manager 5, a user, operator/administrator, or other machine system, for instance. Additional description of a container orchestration platform, such as orchestrator 23A, adding a virtual network interface to a virtual computing instance such as Pod 22A is found in U.S. Patent Publication No. 2022/0279420, published 1 Sep. 2022 and titled "CONTAINERIZED ROUTER WITH VIRTUAL NETWORKING," which is incorporated by reference herein in its entirety.

Server 12A also includes a containerized routing protocol process in the form of containerized routing protocol daemon 24A ("cRPD 24A"). In general, cRPD 24A provides the control plane for the virtual router 21A data plane. Additional description of cRPD 24A and its relationship to virtual router 21A is found in U.S. Patent Publication No. 2022/0279420.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

In accordance with techniques of this disclosure, deployment manager 5 and orchestrator 23A deploy and manage virtual router 21A having DPDK functionality to server 12A. Orchestrator 23A may leverage a virtual router custom resource 31 to allocate instances of at least one resource of the computing device, e.g., CPUs and PCI resources, among the virtual computing instances that execute the DPDK-enabled virtual router and other applications, respectively.

DPDK-enabled virtual router 21A may execute concurrently with other DPDK applications, such as DPDK Pod 22A, which if not addressed can lead to conflict for resources, such as processing units (e.g., CPUs) and Peripheral Component Interconnect identifiers (PCI IDs) for virtual functions. DPDK Pod 22A may include containers that implement one or more functions of a mobile network, such as distributed units (DUs) or central units (CUs), having high resource and service level demands for which resource conflicts can be particularly degrading to performance. In one aspect as described herein for addressing potential CPU conflict, virtual router 21A obtains a CPU allocation from a CPU manager of orchestrator 23A, which also determines and assigns the CPU allocation for the other DPDK applications executing on server 12A, e.g., Pod 22A. In another aspect for addressing potential CPU conflict, virtual router 21A may reserve and exclude some CPUs from the CPU manager and use those reserved CPUs via an input from a virtual router 21A custom resource 31 of orchestrator 23A. As these CPUs are excluded from the CPU manager allocation pool, the other DPDK applications requesting the CPU from the CPU manager will be assigned non-excluded CPUs.

In DPDK, the PCI (Peripheral Component Interconnect) identifier is used to identify and communicate with network interfaces and other devices that are connected to the PCI bus of a computer system. The PCI identifier is composed of a combination of three IDs—the vendor ID, device ID, and subsystem ID, which are assigned by the PCI Special Interest Group (PCI-SIG) to each device connected to the PCI bus.

In addition to physical functions, many modern network interface cards (NICs) support virtual functions (VFs). VFs are a way to partition the resources of a physical NIC into multiple smaller virtual NICs, each with their own PCI identifier. These VFs are typically managed by a hypervisor or virtualization layer, which presents them to virtual machines (VMs), Pods, or other virtual computing instances running on the host as if the virtual NICs were physical NICs.

When DPDK is used in a virtualized environment with VFs, DPDK needs to be able to identify and communicate with these virtual devices using their unique PCI identifiers. The PCI identifier of a VF is composed of the same three IDs as a physical device, but with a different function ID to differentiate it from the physical function.

To communicate with VFs using DPDK, the VF PCI identifier is first discovered by the DPDK driver, typically via a VF discovery mechanism provided by the hypervisor or virtualization layer. The driver then uses the VF PCI identifier to allocate and configure resources for the VF, allowing it to function as a separate virtual NIC.

In the example of FIG. 1, NIC 13A supports VFs. In some aspects, the techniques include avoiding PCI identifier (PCI ID) conflicts with other DPDK workloads. In general, when a DPDK application starts, during Environment Abstraction Layer initialization, the DPDK application checks for what interfaces are already bound to VFIO or uio_pci_generic, and EAL initialization will be done for these interfaces whether or not the interfaces are used. Accordingly, if two DPDK applications are running, they will conflict with each other's PCI addresses as both may attempt try to initialize the same interfaces. To avoid such issues, some aspects of virtual router 21A receive interface names (e.g., "ens1f1") as user input from a configuration via custom resource 31, and the DPDK Init container 404 obtains the corresponding PCI IDs for the corresponding interfaces (interface name to PCI ID mappings) that are intended to be owned by virtual router 21A, and the DPDK Init container 404 then passes these via a PCI whitelist option to virtual router 21A, which uses the interfaces for data communications. DPDK Init container 404 may open a command line and store the interface name to PCI ID mappings to a memory or disk location. DPDK Supervisor 422 may later read the mappings from the memory or disk location and use the mappings when starting the virtual router 21A DPDK process (described below). For other DPDK applications (i.e., not virtual router 21A), these PCI IDs can be excluded from the SR-IOV configuration map, and DPDK applications only request from the pool reserved for the application pods (i.e., the pool of PCI IDs excluding those reserved for virtual router 21A). For aspects in which this is configurable, where virtual router 21A may run independently as the only DPDK application on server 12A, all interfaces may be available.

As described below, a manifest for the virtual router pod can be applied by virtual router job 652 (FIG. 6) to specify the interface name(s) for virtual function(s) in virtual router custom resource 31. Once virtual router 220 is deployed, DPDK Supervisor 422 can obtain the corresponding PCI IDs for the corresponding interfaces that are intended to be owned by virtual router 21A, and the DPDK driver then passes these via a PCI whitelist option to virtual router 21A, which uses the virtual functions for data communications. DPDK Supervisor 422 is a parent process of the virtual router 21A DPDK process. DPDK Supervisor 422 controls the bind logic and command line passing to the DPDK process. Command creation with PCI IDs may be performed by DPDK Init 404 as part of initialization.

In the context of FIG. 1, both DPDK-enabled virtual router 21A and DPDK-enabled pod 22A may communicate with respective virtual functions 27A, 27B of NIC 13A. DPDK Pod 22A has a separate data interface 28 with virtual router 21A but can communicate directly with virtual function 27A using DPDK. An example use case for this configuration may be in the context of 5G mobile network functions, in which a DU or CU function is implemented as a container in pod 22A co-located in server 12A with virtual router 21A. The function may communicate with a Radio Unit (RU) via VF 27A and communicate with upstream (toward the core network) components (e.g., CU or User Plane Function) via data interface 28 and virtual router 21A.

Virtual router custom resource 31 may include a configuration element to receive an interface name for virtual function 27B as input, and the DPDK driver obtains a PCI ID for virtual function 27B that is thereby intended to be owned by virtual router 21A. DPDK Supervisor 422 passes these via a PCI whitelist option to virtual router 21A, which selects the PCI ID for virtual function 27B from among the PCI IDs in the PCI whitelist. Virtual router 21A then communicates with VF 27A as if it were a physical interface. The DPDK driver excludes the PCI ID for virtual function 27B from the SR-IOV configuration map, and when pod 22A requests from a PCI ID for a VF from the remaining pool reserved for the application pods, pod 22A receives in this case the PCI ID for VF 27A. Pod 22A then communicates with VF 27A as if it were a physical interface.

In some aspects, the techniques include an application package and control flow for configuring and deploying virtual router 21A using orchestrator 23A and virtual router custom resource 31. Virtual router custom resource 31 may include configuration elements conventionally exposed by a physical or virtual router, but the configuration elements may be consolidated along with Kubernetes native/built-in resources to support a unified intent model that is realized by Kubernetes controllers and by custom resource controller(s) that work to reconcile the actual state of the virtual router with the intended state. The application package 29 for virtual router 21A and provided to the orchestrator 23A, executing on the computing device, includes a deployer pod to create the virtual router custom resource definition (CRD) with the orchestrator 23A, which then (1) monitors and reconciles the virtual router custom resource instance on configuration changes, and (2) deploys (including redeploying/restarting) a pod for virtual router 21A that includes those containers used to implement virtual router 21A with the requested configurations. As a result, the techniques provide a technical improvement in that the administrator for the network or a distributed application, when performing virtual router 21A deployment and configuration, is able to rely on a cloud-native framework that leverages an orchestrator interface of orchestrator 23A to simplify configuring or reconfiguring virtual router 21A, even for configurations that must occur at virtual router 21A initialization.

In some aspects, the techniques may include using orchestrator 23A probing to facilitate virtual router 21A data plane monitoring and corrective actions, where virtual router 21A exposes its own internal state tracking via endpoints (e.g., HTTP REST endpoints). The same endpoint may be used for different types of corrective actions, depending on the probe response provided by virtual router 21A. As a result, the techniques provide a technical improvement in that orchestrator 23A, also executing with virtual router 21A on server 12A, can take corrective actions within the server 12A itself, which may for example reduce the latency of necessary restarts of the virtual router 21A containers and have other advantages over conventional monitoring techniques. The probes may be Kubernetes liveness probes.

Some example uses for the above probing framework are as follows. Virtual router 21A may track critical issues via a monitoring/watchdog thread. On detecting critical errors, e.g., interface in error state or thread deadlock, an endpoint query will return failure with an appropriate error code. Orchestrator 23A may, in response to this failure, restart virtual router 21A to recover the data plane back to a working state. This endpoint for monitoring may in some aspects be exposed only via the virtual router agent container, but this tracks both virtual router agent and virtual router data plane states, Container restarts may be synchronized between virtual router agent and the virtual router data plane in a way such that they don't go out of sync. Alternatively, as the endpoints used for liveness probe are exposing various states, these can also be monitored via a monitoring agent which can perform better corrective actions than simply restarting the container, such as by reconfiguring a MAC table size or changing rate limit parameters for a Layer-2 mode cell site router use case.

While described above with respect to one server 12A and its components (e.g., virtual router 21A, orchestrator 23A, etc.) as an example, the various techniques of this disclosure may be used for configuring, deploying, and monitoring components on any of servers 12.

Figure 2:
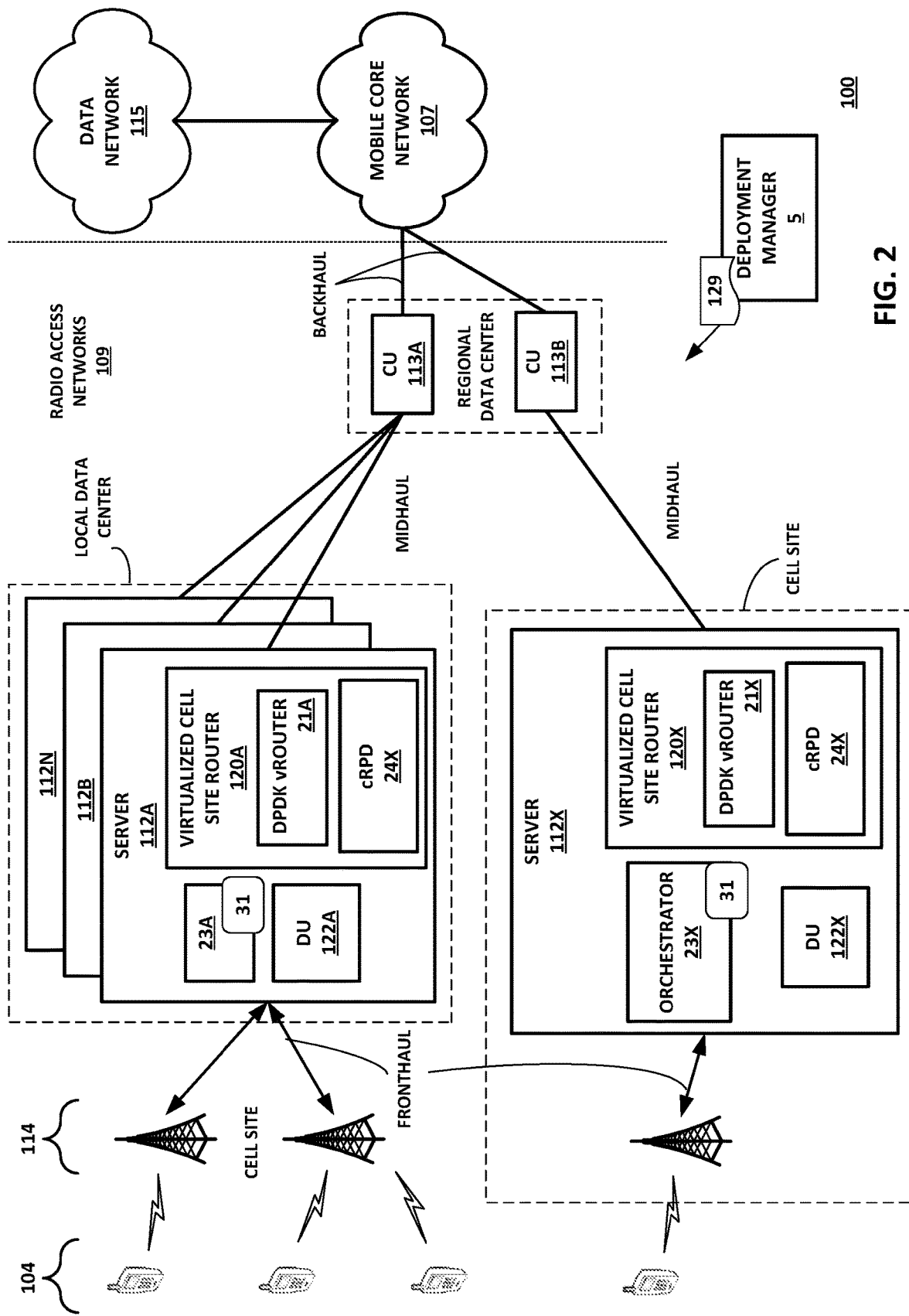
FIG. 2 is a block diagram illustrating an example mobile network system, in accordance with techniques described in this disclosure.

FIG. 2 is a block diagram illustrating an example mobile network system, in accordance with techniques described in this disclosure. Mobile network system 100 may be a 5G network that implements 5G standards promulgated by, e.g., the $3^{rd}$ Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment—different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively. Additional data plane elements known as user plane functions (UPFs) operate in mobile core network 107 to forward traffic between the CU and data network 115. Additional control plane elements operate in mobile core network 107. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 109 and mobile core network 107. Radio access networks 109 include RUs 114 located at various cellular network sites ("cell sites"). Each RU 114 consists of an LO PHY and a RF transmitter. The LO PHY component may be implemented using specialized hardware for high-performance packet processing.

RUs 114 connect to DUs 122A-22X (collectively, "DUs 122") via the fronthaul network. The fronthaul network connects LO PHY and HI PHY and is used by RUs 114 and DUs 122 to implement the F2 interface of 5G. DUs 122 manage the packet transmission of radio by the RUs 114. In some cases, such packet transmission conforms to the Common Packet Radio Interface (CPRI) and/or to the enhanced CPRI (eCPRI) standard, or to IEEE 19114.3. DUs 122 may implement the Radio Link Control (RLC), Media Access Control (MAC), and the HI PHY layer. DUs 122 are at least partially controlled by CUs 113A-13B (collectively, "CUs 113").

DUs 122 connect to CUs 113 via the midhaul network, which may be used by DUs 122 and CUs 113 to implement the F1 of 5G. CUs 113 may implement the Radio Resource Control (RRC) and Packet Data Convergence Protocol (PDCP) layers. CUs 113 connect to mobile core network 107 via a backhaul network. The midhaul and backhaul networks may each be wide area networks (WANs).

In radio access networks 109 of mobile network system 100, the gNodeB includes one of CUs 113 and one of DUs 122. A CU may support multiple DUs to implement multiple gNodeBs. And one or more RUs may be supported by a single DU. Thus, for example with respect to FIG. 1, CU 113A and DU 122A (of server 112A) and one of RUs 114 may form one eNodeB, while CU 113A and DU 122B (of server 112B) and another one of RUs 114 may form another eNodeB.

As shown in FIG. 1, any DU of DUs 122 may or may not be located at the cell site that includes the RU(s) 114 supported by the DU. DU 122X is located at the cell site, while DUs 122A-22N are located at a local data center and collectively support multiple RUs 114. Mobile network system 100 may have radio access networks 109 that include many thousands of cell sites, each having one or more RUs 114s and optionally one or more DUs 122. Whether located at a cell site or offsite, a DU is typically within 20 km of the supported RUs. CUs 113 are shown in FIG. 1 as located at a regional data center, typically within 40 km of the supported DUs 122.

Radio access networks 109 connect to mobile core network 107 to exchange packets with data network 115. Mobile core network 107 may be a 5G core network, and data network (DN) 15 may represent, for example, one or more service provider networks and services, the Internet, $3^{rd}$ party services, an IP-multimedia subsystem, or other network.

Mobile network system 100 includes multiple servers 112A-12X to execute DUs 122. Each of servers 112 may be a real or virtual server that hosts/executes software that implements DUs 122. Such software may include one or more applications deployed as, e.g., virtual machine or containers, to servers 112. While not shown in FIG. 1, CUs 113 may also be executed by servers. Servers 112 may be similar to servers 12 of FIG. 1, though with the specific deployment use case within mobile network systems and mobile network functions, e.g., DU or CU, deployed using virtual computing instances thereon.

The combination of DUs 122, the midhaul network, CUs 113, and the backhaul network effectively implement an IP-based transport network between the radio units 114 and mobile core network 107.

Virtualized cell site routers 124A-124X ("vCSRs 120A-120X" and collectively, "vCSRs 120") provide layer 3 routing functionality between DUs 122 and CUs 113. Each of these vCSRs 120 may be executed on the same server 12 as one or more DUs 122 to provide provider edge router functionality to such DUs 122. Although each of vCSRs 120 is termed a "cell site" router, any of vCSRs 120 may be deployed to a local data center together with one or more DUs 122 for which the vCSR provides IP services, as shown with respect to vCSRs 120A-20N, i.e., where the local data center includes servers 112 that execute DUs 122 for one or more cell sites. In some examples, a vCSR may be colocated on a server with any of CUs 113, e.g., at a regional data center. The vCSR in such examples is a virtual cell-site supporting router.

Each of vCSRs 120 is implemented using one of containerized routing protocol daemons 24A-24X ("cRPDs 24A-24X" and collectively, "cRPDs 24"). More specifically, each of vCSRs 120 uses a corresponding cRPD of cRPDs 24 as a control plane for implementing a layer 3 router. The cRPD provides control plane routing functions. For example, the cRPD can execute IP (IPv4/IPv6) underlay routing protocols such as Intermediate System-Intermediate System (IS-IS) and Border Gateway Protocol (BGP); advertise reachability of DUs 122 both inside and outside a cluster, e.g., to CUs 113; implement network namespaces (supported using L3VPN and EVPN Type-5 advertisements); implement Access Control Lists (ACLs) and network policies for security, network isolation, and quality of service (QoS); support tunnels and tunneling protocols (e.g., MPLS, SR-MPLS, SRv6, SR-MPLSoIPv6, SR-MPLSoIPv4, VxLAN, IP-in-IP, GRE); support dynamic tunnels signaled using BGP; support encryption for IPSec tunnels; and program a forwarding plane of the vCSR of the server with learned and/or configured routing information to provide layer 3 packet forwarding, encapsulation, packet filtering, and/or QoS between one or more of DUs 122 and one of CUs 113.

For example, vCSR 120A executed by server 112A includes cRPD 24A and a forwarding plane of server 112A in the form of DPDK virtual router 21A. cRPD 24A provides one or more of the above routing functions to program a forwarding plane of vCSR 120A in order to, among other tasks, advertise a layer 3 route for DU 122A outside of the cluster—including across the midhaul network to CU 113A—and forward layer 3 packets between DU 122A and CU 113A. In this way, the techniques may realize cloud-native, containerized cell site routers 120 executing on the same servers 112 as containerized DUs 122, thus significantly reducing latency on the midhaul between DUs 122 and CUs 113.

vCSRs 120 as containerized routers allow an x86-based or ARM-based host to be a first-class member of the network routing system, participating in protocols such as IS-IS and BGP and providing MPLS/SR-based transport and multi-tenancy. Thus, rather than being appendages to the network (similar to a customer edge (CE) router), vCSRs 120 may operate as provider edge (PE) routers for networks transporting layer 3 packets among DUs 122, CUs 113, and mobile core network 107.

Moreover, in some examples, the integration of cRPDs 24 and host-based forwarding planes may also deliver a Kubernetes CNI-compliant package that is deployable within a Kubernetes environment. The execution by a single server of a DU 122 and a vCSR 120 together can avoid a two-box solution with a separate DU and router, potentially reducing costs, power, and space requirements, which is particularly attractive for cell sites. Application workloads can be containerized network functions (CNFs), such as DUs or CUs, as already mentioned.

Orchestrators 23 of servers 113 are similar to those of FIG. 1 and orchestrate respective DUs 122, DPDK virtual routers 21, and containerized RPDs 24. For example, orchestrator 23A orchestrates DU 122A, DPDK virtual router 21A, and cRPD 24A. Again, and similar to the description in FIG. 1, deployment manager 5 uses an application package 29 having characteristics similar to those of application package 29 to deploy any of virtual routers 21. A user may select a set of values for application package 29 to combine with a template, which deployment manager 5 uses to generate a manifest file for any of virtual routers 21, for use by the corresponding orchestrator 23 to deploy and configure the virtual router 21 on its server 112.

Various aspects of this disclosure described above with respect to FIG. 1, including PCI ID conflict avoidance, CPU allocation for conflict avoidance, application package and control flow for configuring and deploying virtual router 21A using orchestrator 23A and a virtual router custom resource 31, and orchestrator 23A-based probing, apply in like respect to devices and components of mobile network system 100 of FIG. 2.

Existing mobile networks use a physical cell site router that is located on or close to each BBU. Physical routers often have specialized form factors, are relatively difficult to update and configure, and are relatively difficult to replace due to vendor lock-in effects. While these effects are tolerable where there are relatively few cell sites, as with 3G and 4G/LTE mobile networks, the comparatively large number of cell sites required by RANs for 5G mobile networks exacerbates the capital and operational costs related to these effects. And although 5G network providers are moving to a disaggregated RAN architecture (e.g., O-RAN), such networks still rely on a physical cell site router or a virtual machine-based router to manage routes and data traffic between the DU and the CU over the midhaul network.

Virtualized cell site routers 120 having containerized routing protocol daemons 24 alleviate many of the negative effects of deploying physical or VM-based routers at the cell site. For example, containerized RPDs 24 are more lightweight in terms of compute resources (CPU, memory) compared to VM-based routers and may be more efficient in terms of space and power utilization than VM-based and physical routers. Virtualized CSRs 120 may achieve these advantages while achieving comparable performance where DPDK-based virtual routers are used as the data plane to provide efficient and high packet I/O rate for vCSRs 120 to communicate with DUs 122. That is, having vCSR 120A and DU 122A (e.g., an O-DU) on a single physical server 112A with DPDK-based data plane can offer packet forwarding performance on par with a physical cell site router. As further examples of technical advantages, vCSRs 120 eliminate the need for physical cell site router and may reduce the space, reduce power consumption, and also reduce capital/operational expenditures. Additionally, in some examples and as described in further detail below, vCSRs 120 can be integrated into a Kubernetes infrastructure by presenting vCSRs 120 as Container Networking Interfaces (CNIs) to the orchestration platform, usable for configuring networking for the application workloads. Thus, by deploying containerized vCSRs 120/RPDs 24 for use as CNIs, integrating into mobile network system 100, and integrating into Kubernetes, the techniques may facilitate a cloud native experience for vCSR 120 deployment and configuration. Integrating in Kubernetes permits leveraging its existing mechanisms for monitoring the health of containerized RPD 24s and restarting if necessary, along with managing the life-cycle of the vCSRs 120 and in particular, containerized RPDs 24.

Figure 3:
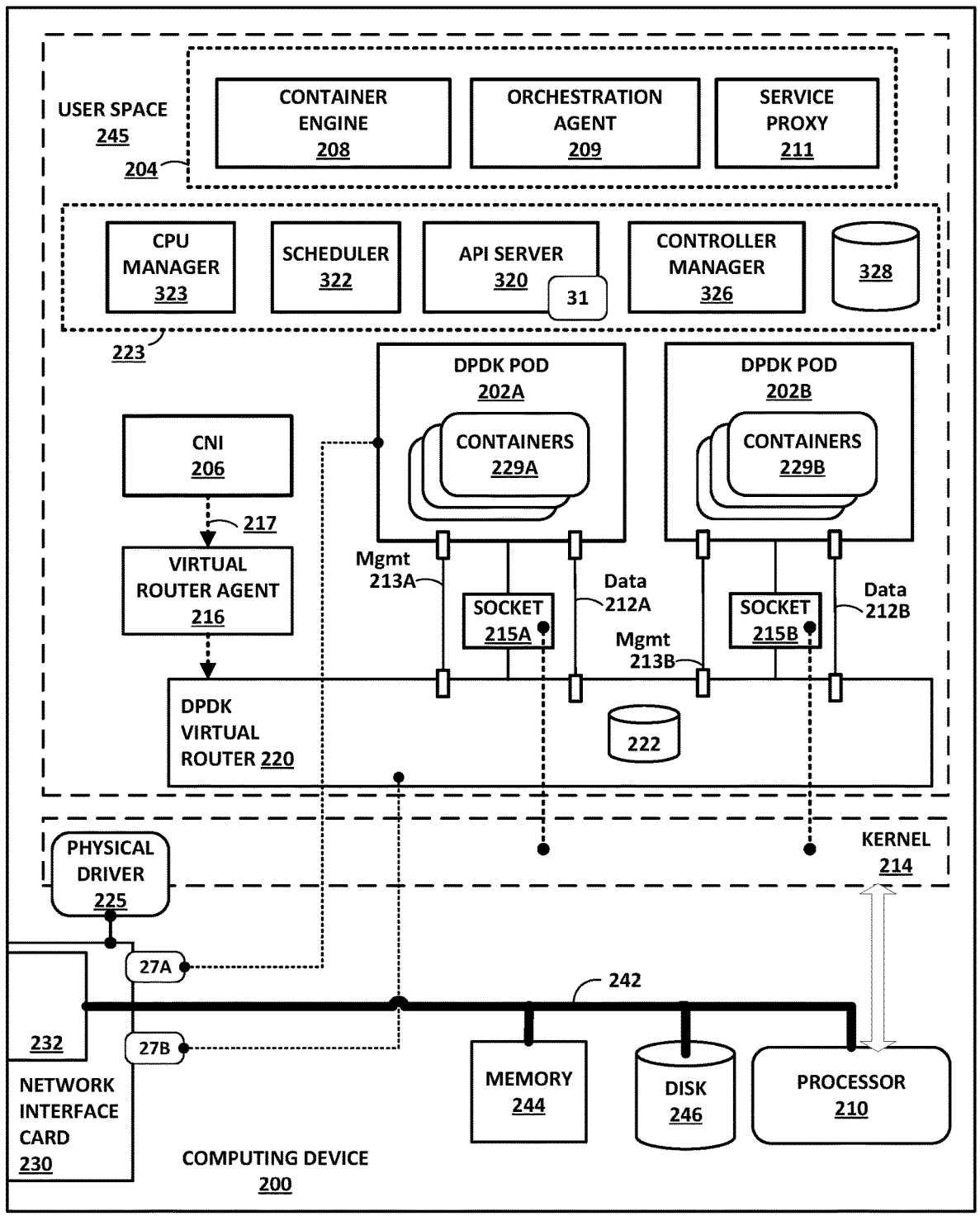
FIG. 3 is a block diagram of an example computing device, according to one or more aspects described in this disclosure.

FIG. 3 is a block diagram of an example computing device, according to one or more aspects described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more hardware-based processors 210 (hereinafter, "processor 210"). NIC 230 may be SR-IOV-capable. A front-side bus may in some cases couple processor 210 and memory device 244. In some examples, bus 242 may couple memory device 244, processor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Processor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more physical interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory. NIC 230 supports DPDK and virtual functions 27A, 27B for SR-IOV.

Memory 244, NIC 230, storage disk 246, and processor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some examples, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual computing instances, such as containers 229A and 229B or one or more virtual machines (not shown in FIG. 2). Shared virtual devices such as virtual functions may provide dedicated resources such that each of the virtual computing instances may access dedicated resources of NIC 230, which therefore appears to each of the virtual computing instances as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including DPDK-based virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Virtual router 220 can be executing as a kernel module or as a user space DPDK process (virtual router 220 is shown here in user space 245). Virtual router agent 216 may also be executing in user space. In the example computing device 200 of FIG. 2, virtual router 220 executes within user space as a DPDK-based virtual router, but virtual router 220 may execute within a hypervisor, a host operating system, a host application, or a virtual machine in various implementations. Virtual router agent 216 has a connection to network controller 25 using a channel, which is used to download configurations and forwarding information. Virtual router agent 216 programs this forwarding state to the virtual router data (or "forwarding") plane represented by virtual router 220. Virtual router 220 and virtual router agent 216 may be processes.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing.

Virtual router 220 may be multi-threaded and execute on one or more processor cores. Virtual router 220 may include multiple queues. Virtual router 220 may implement a packet processing pipeline. The pipeline can be stitched by the virtual router agent 216 from the simplest to the most complicated manner depending on the operations to be applied to a packet. Virtual router 220 may maintain multiple instances of forwarding bases. Virtual router 220 may access and update tables using RCU (Read Copy Update) locks.

To send packets to other compute nodes or switches, virtual router 220 (data plane) uses one or more physical interfaces 232. In general, virtual router 220 exchanges overlay packets with workloads, such as VMs or pods 202 (in FIG. 2). Virtual router 220 is configured with multiple virtual router network interfaces (e.g., vifs). These interfaces may include an interface to the underlay NIC 230 (vif 0/0)—a Linux bond interface in some examples; a kernel interface, vhost0 (or vif 0/2), for exchanging packets with the host operating system; an interface with virtual router agent 216, pkt0 (or vif 0/2), to obtain forwarding state from the network controller and to send up exception packets. Additional virtual router network interfaces are for communications with virtual computing instances, such as DPDK pods 202A-202B (collectively, "pods 202"). Virtual router network interfaces may be alternatively referred to as virtual network interfaces in some contexts described in this disclosure, in that virtual network interfaces for the virtual computing instances, including pods or other workloads are implemented in part using virtual router network interfaces.

Virtual network interfaces 212A-212B (collectively, "virtual network interfaces 212") and 213A-213B (collectively, "virtual network interfaces 213") of virtual router 220 are illustrated in FIG. 2. Each of virtual network interfaces 212, 213 may be a tap interface, DPDK interface, Unix domain socket, virtio interface, veth interface, macvlan, another type of interface, or a combination of types of interfaces.

In a kernel-based deployment of virtual router 220 (not shown), virtual router 220 is installed as a kernel module inside the operating system. Virtual router 220 registers itself with the TCP/IP stack to receive packets from any of the desired operating system interfaces that it wants to. The interfaces can be bond, physical, tap (for VMs), veth (for containers), etc. Virtual router 220 in this kernel mode relies on the operating system to send and receive packets from different interfaces. For example, the operating system may expose a tap interface backed by a vhost-net driver to communicate with workloads. Once virtual router 220 registers for packets from this tap interface, the TCP/IP stack sends all the packets to it. Virtual router 220 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 220 (shown in FIG. 2), virtual router 220 is installed as a user space 245 application that is linked to the DPDK library. This may lead to faster performance than a kernel-based deployment, particularly in the presence of high packet rates. The physical interfaces 232 are used by the poll mode drivers (PMDs) of DPDK rather than the kernel's interrupt-based drivers. The registers of physical interfaces 232 may be exposed into user space 245 in order to be accessible to the PMDs; a physical interface 232 bound in this way is no longer managed by or visible to the host operating system, and the DPDK-based virtual router 220 manages the physical interface 232. This includes packet polling, packet processing, and packet forwarding. In other words, user packet processing steps are performed by the virtual router 220 DPDK data plane. The nature of this "polling mode" makes the virtual router 220 DPDK data plane packet processing/forwarding much more efficient as compared to the interrupt mode when the packet rate is high. There are comparatively few interrupts and context switching during packet I/O, compared to kernel-mode virtual router 220, and interrupt and context switching during packet I/O may in some cases be avoided altogether.

Pods 202 are DPDK-based pods in the example of FIG. 3. In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of a host IP address of the computing device 200 on which the pod 202B. The virtual network address may thus differ from the logical address for the underlying, physical computer system, e.g., computing device 200. While illustrated as DPDK-based pods, other types of workloads may be used, including non-DPDK-based pods, virtual machines, etc. Such workloads may have virtual network interfaces that are veth, macvlan, or other type of interface with the virtual router. Virtual router 220 is illustrated and described as a DPDK-based virtual router but may be implemented as a non-DPDK-based virtual router that executes in, e.g., kernel 214, or as part of NIC 230 in examples in which NIC 230 is a SmartNIC.

Computing device 200 includes a virtual router agent 216 that controls the overlay of virtual networks for computing device 200 and that coordinates the routing of data packets within computing device 200. In general, virtual router agent 216 communicates with network controller 25 (FIG. 1) for the virtualization infrastructure, which generates commands to create virtual networks and configure network virtualization endpoints, such as computing device 200 and, more specifically, virtual router 220, as well as any of virtual network interfaces 212, 213. By configuring virtual router 220 based on information received from network controller 25, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domains may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 25 may provide a logically centralized controller for facilitating operation of one or more virtual networks. The network controller 25 may, for example, maintain a routing information base, e.g., one or more routing tables that store routing information for the physical network as well as one or more overlay networks. Virtual router 220 implements one or more virtual routing and forwarding instances (VRFs) 222 for respective virtual networks for which virtual router 220 operates as respective tunnel endpoints. In general, each of VRFs 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to one of VRFs 222. The VRF may include forwarding information for the inner packet. For instance, the VRF may map a destination layer 3 (L3) address for the inner packet to virtual network interface 212. The VRF forwards the inner packet via virtual network interface 212 to POD 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 (L2) address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 25 of FIG. 1) configures a default route in each of pods 202 to cause the pods to use virtual router 220 as an initial next hop for outbound packets. In some examples, NIC 230 is configured with one or more forwarding rules to cause all packets received from the pods to be switched to virtual router 220.

Pods 202A-202B may represent example instances of pod 22A of FIG. 1, in further detail. Pod 202A includes one or more containers 229A, and pod 202B includes one or more containers 229B. Containers 229A may implement a DU or CU, in some examples, or another application. Containers 229B may implement cRPD or another application.

Container platform 204 may represent an example instance of container platform 19A of FIG. 1, in further detail. Container platform 204 include container engine (or "runtime") 208, orchestration agent 209, service proxy 211. CNI 206 may represent an example instance of CNI 17A of FIG. 1. Contrail or Tungsten Fabric is an example network control architecture. CNI 206 may be developed for Contrail or Tungsten Fabric. A Contrail/Tungsten Fabric controller may be an example of network controller 25.

Container engine 208 includes code executable by processor 210. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from orchestration agent 209, container engine 208 may obtain images and instantiate them as executable containers 229A-229B in pods 202A-202B.

Service proxy 211 includes code executable by processor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a Kubernetes kube-proxy. In some examples, container platform 204 does not include a service proxy 211 or the service proxy 211 is disabled in favor of configuration of virtual router 220 and pods 202 by CNIs 206.

Orchestration agent 209 includes code executable by processor 210. Orchestration agent 209 may be one or more computer processes. Orchestration agent 209 may represent a Kubernetes kubelet. Orchestration agent 209 is an agent of an orchestrator, e.g., orchestrator 223, that receives Kubernetes manifests or other container specification data for containers and ensures the containers execute by computing device 200. Container specification data may be in the form of a manifest file sent to orchestration agent 209, by a deployment manager via orchestrator 223, or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229, virtual router 220, virtual router agent 216. Based on the container specification data, orchestration agent 209 directs container engine 208 to obtain and instantiate the container images for containers 229, for execution of containers 229 by computing device 200.

Orchestration agent 209 instantiates CNI 206 to configure one or more virtual network interfaces for each of pods 202. CNI 206 may represent an example instance of CNI 17A of FIG. 1. For example, orchestration agent 209 receives a container specification data for pod 202A and directs container engine 208 to create the pod 202A with containers 229A based on the container specification data for pod 202A. Orchestration agent 209 may also invoke the CNI 206 to configure, for pod 202A, virtual network interface 212A for a virtual network corresponding to one of VRFs 222. Any of virtual network interfaces 213A-213B may represent an example instance of management interface 26 described in FIG. 1, and any of data interfaces 212A-212B may represent an example instance of data interface 28 described in FIG. 1. Management virtual network interfaces 213A-213B may be attached to a different VRF (or respective different VRFs) than the VRF(s) any of data virtual network interfaces 212A-212B.

CNI 206 may obtain interface configuration data for configuring virtual network interfaces for pods 202. Virtual router agent 216 operates as a virtual network control plane module for enabling network controller 25 to configure virtual router 220. Unlike the orchestration control plane (including the container platforms 204 for minion nodes and the master node(s), e.g., orchestrator 23), which manages the provisioning, scheduling, and managing virtual computing instances, a virtual network control plane (including network controller 25 and virtual router agent 216 for minion nodes) manages the configuration of virtual networks implemented in the data plane in part by virtual routers 220 of the minion nodes. Virtual router agent 216 communicates, to CNI 206, interface configuration data for virtual network interfaces to enable an orchestration control plane element (i.e., CNI 206) to configure the virtual network interfaces according to the configuration state determined by the network controller 25, thus bridging the gap between the orchestration control plane and virtual network control plane. In addition, this may enable a CNI 206 to obtain interface configuration data for multiple virtual network interfaces for a pod and configure the multiple virtual network interfaces.

Scheduler 322, API server 320, controller manager 326, CPU manager 323, and configuration store 328 are executed by the hardware environment of computing device 200 to implement orchestrator 223, which may represent an example of any of orchestrators 23 of FIGS. 1-2. Controller manager 326 may represent an example implementation of a Kubernetes cloud controller manager or Kube-manager.

API server 320, scheduler 322, controller manager 326, and configuration store 328 may implement a master node for a cluster and be alternatively referred to as "master components." The cluster may a Kubernetes cluster and the master node a Kubernetes master node, in which case the master components are Kubernetes master components.

API server 320 includes code executable by processor 310. API server 320 may be one or more computer processes. API server 320 validates and configures data for objects, such as virtual computing instances (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual computing instances in the computing infrastructure 8. API server 320 may represent a Kubernetes API server.

API server 320 of computing device 200 is extended, optionally with a customer API server (not shown), to present a virtual router custom resource 31 ("VR CR 31") that extends the native resources of orchestrator 223 to define a new type of object, a virtual router object, for virtual router 220 of computing device 200. VR CR 31 is operated according to a custom resource definition (CRD), which defines the schema for VR CR 31. The CRD specifies the API group, version, and kind of VR CR 31, as well as the attributes or properties that VR CR 31 resource has. These attributes or properties may be set using configuration data for a virtual router custom resource.

As described further below, once the CRD for VR CR 31 is created, a VR CR 31 (corresponding to virtual router object) is created and presented based on that definition. The corresponding virtual router object can in this way be created, updated, and deleted as if it were any other native resource of the orchestrator 223 using API server 320. In some examples, a custom resource controller for VR CR 31 reconciles intended state for VR CR 31 to an actual state of virtual router 220. In some examples, a reconciler watches for changes on VR CR 31 exposed by API server 320 (or any custom API server), and applies logic developed to reconcile the state of virtual router 220 to VR CR 31. Consequently, VR CR 31 includes configuration elements conventionally exposed by a physical or virtual router, but that—in accordance with techniques of this disclosure—have been consolidated along with orchestrator 223 native/built-in resources to support an intent model that is realized by orchestrator 223 controllers and by custom resource controller(s) that work to reconcile the actual state of virtual router 220 with the intended state using a co-located (i.e., same server) orchestrator 223 in communication with a deployment manager. Additional description of custom resources and CRDs if found in U.S. patent application Ser. No. 18/147,599, filed 28 Dec. 2022 and titled "Intent-Driven Configuration of a Cloud-Native Router," which is incorporated by reference herein in its entirety.

Orchestrator 223 receives application package 29 for virtual router 220. Application package 29 includes a deployer pod to create the virtual router custom resource definition (CRD) for VR CR 31 with the orchestrator 23A, which then (1) monitors and reconciles the virtual router CRD instance on configuration changes, and (2) deploys (including redeploying/restarting) a pod for virtual router 220 that includes those containers used to implement virtual router 220 with the requested configurations received in the application package 29. As a result, the administrator for the network or a distributed application, when performing virtual router 220 deployment and configuration, is able to rely on a cloud-native framework that leverages an orchestrator interface of orchestrator 223 to simplify configuring or reconfiguring virtual router 220, even for configurations that must occur at virtual router 220 initialization.

Configuration store 328 is a backing store for all cluster data for the cluster managed by orchestrator 223, which in this case is computing device 200. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by processor 210. Scheduler 322 may be one or more computer processes. Scheduler 322 monitors for newly created or requested virtual computing instances (e.g., pods of containers) and selects a minion node on which the virtual computing instances are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual computing instance (e.g., a Pod) for computing device 200. API server 320 may invoke orchestration agent 209, which may cause the container engine 208 to obtain the virtual computing instance from a storage server and create the pod on computing device 200. The orchestration agent 209 may update the status for the virtual computing instance to the API server 320, which persists this new state to the configuration store 328. In this way, computing device 200 instantiates new virtual computing instances.

Controller manager 326 includes code executable by processor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, service accounts controller, and custom controller for VR CR 31. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

CPU manager 323 of orchestrator 223 uses a container's runtime interface to set or modify the CPUs on which containers can run. CPU Manager 323 uses two policies, None and Static, to decide the allocation of CPUs. The CPU manager is enabled with the None policy by default. The Static policy allocates exclusive CPUs to pod containers which request integer CPUs.

Virtual router 220 may be containerized and executing within a Pod that executes simultaneously with DPDK Pods 202A-202B. In one aspect as described herein for addressing potential CPU conflict, virtual router 220 obtains a CPU allocation (a set of CPUs of computing device 200) from CPU manager 323, which also determines and assigns the CPU allocation for the other DPDK applications executing on computing device 200. Virtual router 220 obtain the CPU allocation via a request for the CPU allocation as "resources" specified in a manifest for the pod that executes virtual router 220. For example, the manifest for the pod may include the text 'resources: requests: cpu: "2"' to request and receive 2 CPUs of computing device. Similarly, a manifest for pod 202A may include a request for a CPU allocation as "resources" specified in a manifest for pod 202A. Manifests for pods may be YAML or JSON files or other suitable file type. A manifest is a text file representation of the underlying object. Manifests may alternatively be referred to as "specs" because they include the specification of the underlying object.

In another aspect for addressing potential CPU conflict, virtual router 220 reserves and excludes some CPUs from CPU manager 220 and uses those reserved CPUs. As these CPUs are excluded from the CPU manager 323 allocation pool, the other DPDK applications requesting the CPU from the CPU manager 323 will be assigned non-excluded CPUs. The specified CPUs reserved by virtual router 220 may be specified via an input from virtual router custom resource 31. As described below, a manifest for the virtual router pod can be applied by virtual router job 652 to specify the CPUs in virtual router custom resource 31. Once virtual router 220 is deployed, it can request the specified CPUs. An example parameter for the manifest for the virtual router pod to specify the CPUs is "cpuCoreMask: 2,3,4,5". This example causes virtual router 220 to request CPUs with CPU IDs 2, 3, 4, and 5. Other CPUs of computing device 200 would be left in the shared pool for use by other Pods, e.g., Pods 202.

In Kubernetes, the static policy manages a shared pool of CPUs that initially contains all CPUs in the node. The amount of exclusively allocatable CPUs is equal to the total number of CPUs in the node minus any CPU reservations. The CPU reservation list can be specified explicitly using the kubelet interface. Reserved CPUs are taken, in integer quantity, from the initial shared pool. This shared pool is the set of CPUs on which any containers in BestEffort and Burstable pods run. Containers in Guaranteed pods with fractional CPU requests also run on CPUs in the shared pool. Only containers that are both part of a Guaranteed pod and have integer CPU requests are assigned exclusive CPUs.

Various components, functional units, and/or modules illustrated in the Figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
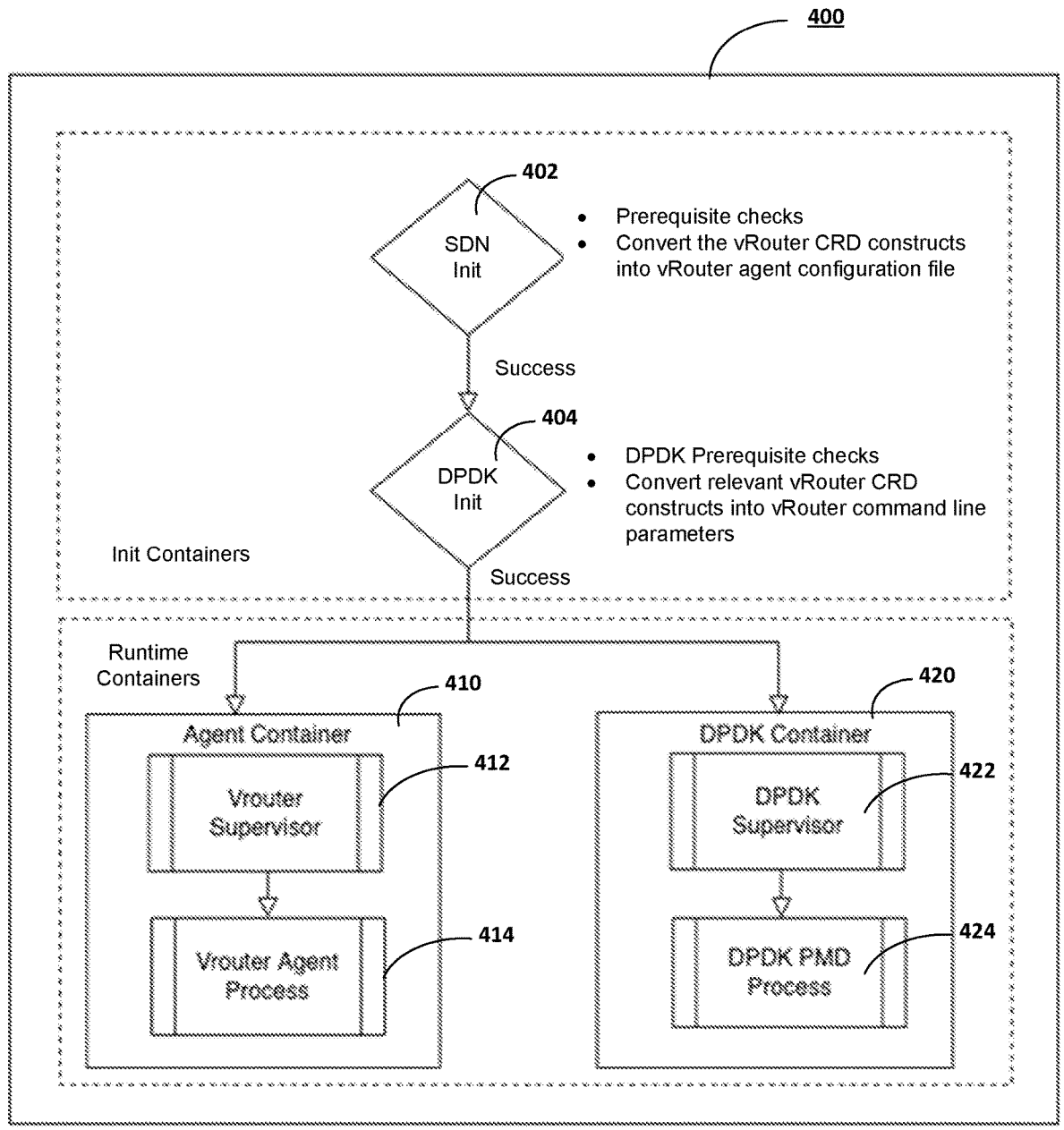
FIG. 4 is block diagram illustrating example containers for a virtual router virtual computing instance and selected configuration operations.

FIG. 4 is block diagram illustrating example containers for a virtual router virtual computing instance and selected configuration operations. The virtual router virtual computing instance is described hereinafter as a virtual router pod 400. Virtual router pod 400 may be included in application package 29.

Virtual router pod 400 includes 4 containers: SDN Init 402, DPDK Init 404, virtual router agent 410, and virtual router data plane 420 (illustrated as "DPDK 420"). Virtual router agent 410 may represent an example instance of virtual router agent 216 of FIG. 3, though in a common pod with virtual router data plane 420. Virtual router data plane 420 may represent an example instance of any of virtual routers 21 of FIG. 1 or of virtual router 220 of FIG. 2.

SDN Init 402 performs prerequisite checks to ensure suitability of the server for deployment of virtual router pod 400. SDN Init 402 also converts properties of the virtual router virtual router CRD instance for VR CR 31, that are relevant to virtual router agent 410, to a configuration file that is processed by the virtual router agent 410 to configure it. If successful, DPDK Init 404 initializes virtual router data plane 420 by performing DPDK prerequisite checks and converting properties of the virtual router virtual router CRD instance for VR CR 31, that are relevant to virtual router data plane 420, to command line parameters. These are eventually entered to the virtual router data plane 420 command line to configure it.

The virtual router agent 410 container includes two components: a virtual router ("vrouter") supervisor 412 and the virtual router agent process 414. The virtual router data plane 420 container includes two components: a virtual router data plane ("DPDK") supervisor 422 and the virtual router data plane process 424, which may include a poll-mode driver.

FIG. 5 is a block diagram illustrating an example computing device 500 having a DPDK-based virtual router and a separate containerized DPDK workload, according to one or more aspects of this disclosure. Virtual router agent 504 may represent an example instance of virtual router agent 216. vRouter DPDK data plane 502 (hereinafter, "virtual router 502") may represent an example instance of virtual router 220 or any of DPDK vRouters 21. Virtual router 502 executes the "forwarding plane" or packet forwarding functionality of the virtual router for computing device 500 and virtual router agent 504 executes the "control plane" functionality of the virtual router.

Virtual router agent 504 includes configuration data 534, virtual routing and forwarding instances configurations 536 ("VRFs 536"), and policies 538. Virtual router agent 504 exchanges control information with one or more virtual network controllers (e.g., network controller 24 of FIG. 1). Control information may include, virtual network routes, low-level configuration state such as routing instances and forwarding policy for installation to configuration data 534, VRFs 536, and policies 538. Virtual router agent 504 may also report analytics state and install forwarding state to forwarding information 526 of virtual router 502. Virtual router agent 504 may apply slow-path packet processing for the first (initial) packet of each new flow traversing virtual router 502 and installs corresponding flow entries to flow tables for the new flows for fast path processing by virtual router 502 for subsequent packets of the flows. Forwarding information 526 may include separating forwarding information 528A-528N for corresponding VRFs 536.

Virtual router 502 may include multiple logical forwarding cores 510, which may be pthreads. Cores 510 may run in a tight loop, also called the poll mode. They can exchange packets among themselves using DPDK queues. Each of cores 510 has a receive queue, which can be used by other cores 510 to enqueue packets that need to be processed by that core. They also poll different virtual router 502 interfaces queues like physical, VM, and tap. Virtual router 502 may thus be a multi-threaded user space application. Forwarding cores 510 poll the physical and virtual interfaces. In addition, forwarding cores 510 can do the virtual router 502 packet processing according to a packet processing pipeline.

A particular forwarding core of cores 510 (the "vhost core") handles the messages between DPDK pod 506 and virtual router 502 on the vhost-user control channel 562, in either client mode or server mode. The communication with DPDK pod 506 is through UNIX socket 560. Once the communication channel is established, the userspace vhost protocol takes place. During this protocol message exchange, pod 506 and the vRouter exchange information about the pod memory regions, virtio ring addresses, and the supported features. At the end of the message exchange, the virtio ring 522 over shared memory 520 is enabled and data communication between pod 506 and virtual router 502 can occur. In this way, the rings 522 and control channel 562 make up a virtual network interface for pod 506 that is a DPDK interface. As described above, the virtual network interface is configured with network configuration data (e.g., overlay/virtual IP address) for forwarding packets sourced by or destined to pod 506.

Pod 506 is a DPDK-enabled pod, and DPDK native application 508 is a DPDK-enabled, containerized application that, in this example, uses virtio PMD 516 and virtio device 517 to set up DPDK rings mapped on virtio rings and exchange overlay packets with virtual router 502. DPDK native application 508 may be a DU or CU for a 5G radio access network.

Another of cores 510 is responsible for sending and receiving packets between virtual router agent 504 and virtual router 502. The initialization sequence for this communication is triggered once a virtual router agent to virtual Netlink channel 552 (e.g., over a socket) has been established. Virtual router agent 504 adds the "pkt0" or the "vif 0/2" interface to the virtual router 502 process using the Netlink channel. Virtual router 502 then creates a UNIX socket in the path "/var/run/vrouter/dpdk_pkt0". This socket will be used by virtual router agent 504 to send packets to virtual router 502. In addition, it connects to another UNIX socket which the vRouter agent has already created. The path for the virtual router agent 504 UNIX socket is "/var/run/vrouter/agent_pkt0". This socket will be used by the virtual router 502 to send packets to virtual router agent 504. The socket protocol is of type PACKET, meaning that the channel only carries packets.

Interface vif 0/1 connects to vhost0, the interface in the Linux kernel. A separate management interface 544 connects eth0 540 of pod 506 and virtio/tap interface 542 of virtual router 502.

Eth1 541 of pod 506 communicates with virtual function 27A of NIC 13 using SR-IOV/DPDK. Consequently, DPDK pod 506 has a "direct" interface via NIC 13 using virtual function 27A and an indirect interface via virtual router data plane 502 and virtual function 27B to support virtual networking.

Figure 6:
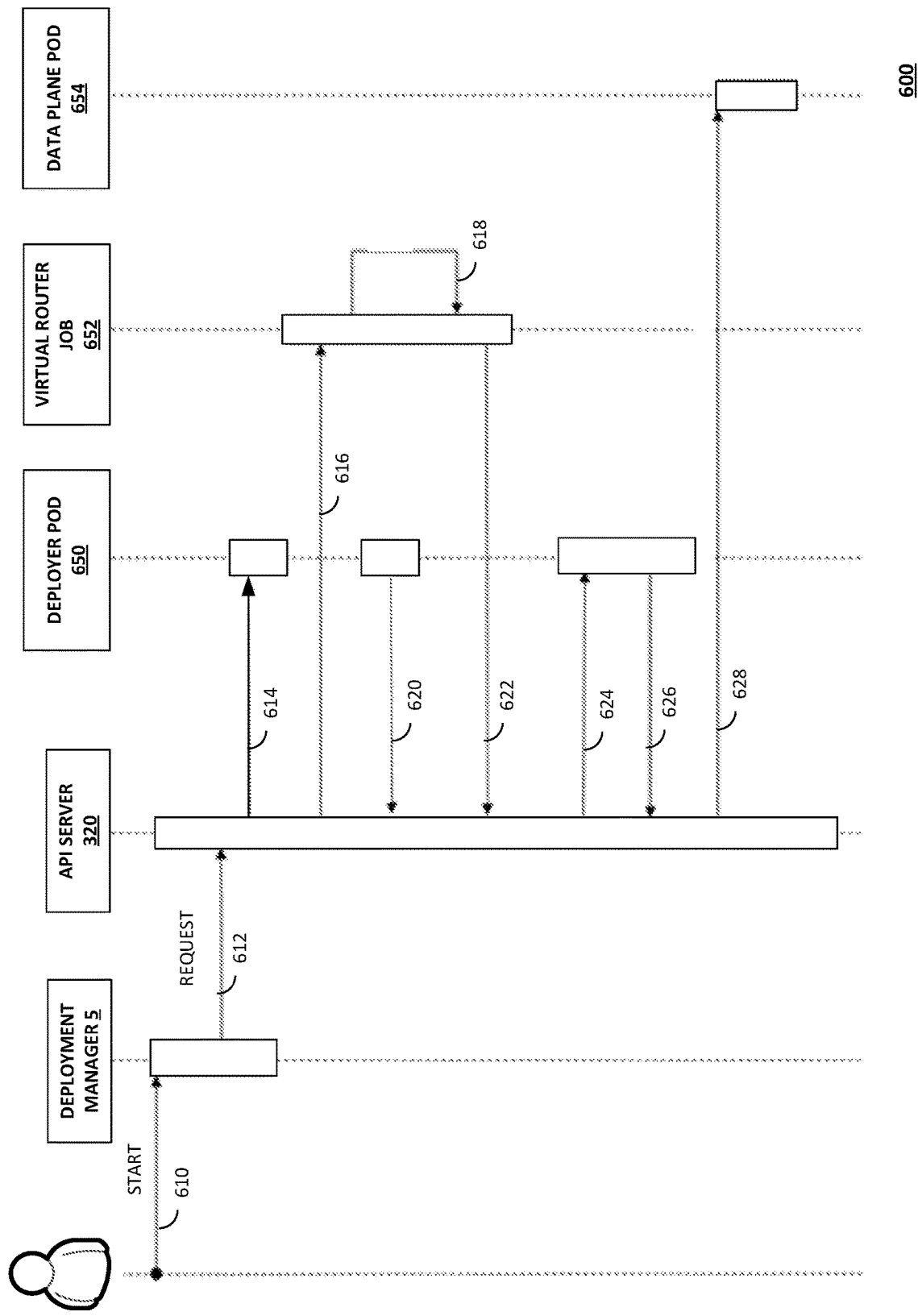
FIG. 6 is a conceptual diagram depicting an example deployment and configuration of a virtual router data plane, in accordance with techniques of this disclosure.

FIG. 6 is a conceptual diagram depicting an example deployment and configuration of a virtual router data plane, in accordance with techniques of this disclosure. In this example 600, a user initiates virtual router deployment to a server (described for FIG. 6 with respect to computing device 200) using deployment manager 5 (610). Deployment manager 5 requests API server 320 to orchestrate the virtual router, which may include a request to create the prerequisite resources for the virtual router on computing device 200 (612), which includes creating a Namespace, ServiceAccount, RoleBinding, ClusterRoleBinding, Deployment, and Job in a Kubernetes deployment. The virtual router includes virtual router data plane 220 and may include virtual router agent 216.

API server 320 creates data plane deployer pod 650 (614) and a virtual router job 652 (616) that is responsible for applying the VR CR 31 once the CRD is created. Data plane deployer pod 650 creates the virtual router CRD in API server 320 (620) as virtual router job 652 waits (618). Once virtual router job 652 receives an indication the virtual router CRD has been created, virtual router job 652 creates a virtual router custom resource instance from VR CR 31 via API server 320 and applies virtual router configuration data (622). The virtual router configuration data may be included in a configuration data file, such as a YAML file. An example configuration data file is included at the end of this description. Virtual router job 652 may be a container orchestration platform job, e.g., a Kubernetes job.

API server 320 has a watch on and reconciles the VR CR 31 properties on any configuration changes (624). Data plane deployer pod 650 issues a request to API server 320 to create the virtual router data plane DaemonSet (626), and API server 320 creates the virtual router data plane DaemonSet (628). Virtual router data plane 220 may thereafter process packets received at computing device 200. A cRPD may operate as the control plane for virtual router data plane 220.

Figure 7:
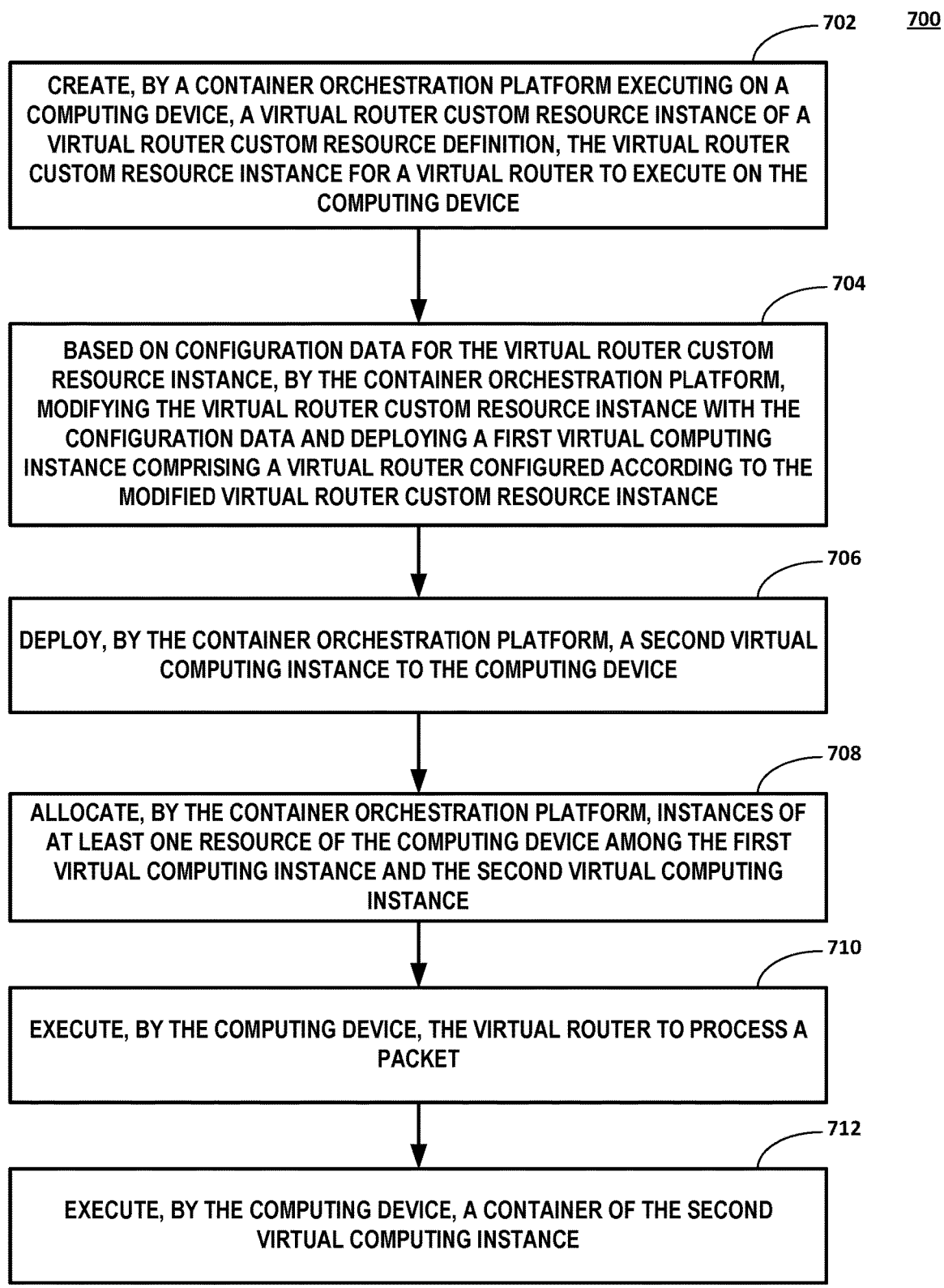
FIG. 7 is a flowchart illustrating an example operation by a computing device, according to techniques of this disclosure.

FIG. 7 is a flowchart illustrating an example operation by a computing device, according to techniques of this disclosure. Operation 700 is described with respect to components of computing device 200 of FIG. 3, but may be performed by other computing devices described herein.

FIG. 7 is a flow diagram illustrating an example operation of an object, in accordance with one or more techniques of this disclosure. As seen in the example of FIG. 7, container orchestration platform 223 creates a virtual router custom resource instance of a virtual router custom resource definition, wherein the virtual router custom resource instance is for virtual router 220 to execute on the computing device (702). The virtual router custom resource definition defines virtual router custom resource 31 in API server 320. Based on configuration data for the virtual router custom resource instance, container orchestration platform 23 modifies the virtual router custom resource instance with the configuration data and deploys a first virtual computing instance comprising virtual router 220 configured according to the modified virtual router custom resource instance (704). Container orchestration platform 23 deploys a second virtual computing instance to the computing device (706). Container orchestration platform 23 allocates instances of at least one resource of the computing device among the first virtual computing instance and the second virtual computing instance (708). The computing device executes the virtual router to process a packet (710). The computing device executes a container of the second virtual computing instance (712).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache). The computer-readable storage media may be distributed among one or more discrete units and may be located within one or more computing, storage, or other devices.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules. Processors and other processing circuitry may be distributed among one or more devices.

An example manifest for a virtual router that includes configuration data for a virtual router custom resource, and can be applied by virtual router job 652, is as follows:

```
apiVersion: v1
items:
- apiVersion: dataplane.site.net/v1alpha1
  kind: Vrouter
  metadata:
    annotations:
      kubectl.kubernetes.io/last-applied-configuration: { *** }
    creationTimestamp: "2023-03-23T14:40:06Z"
    generation: 2
    name: contrail-vrouter-masters
    namespace: contrail
    resourceVersion: "39062047"
    uid: a0f50560-aee8-4bb3-ae1f-3df795617261
  spec:
    agent:
      default:
        agentBaseDirectory: /var/lib/contrail
        coreDumpFilter: "0x13"
        flowCacheTimeout: 0
        httpServerIp: 0.0.0.0
        httpServerPort: 8085
        logFile: /var/log/contrail/contrail-vrouter-agent.log
        logLevel: SYS_INFO
        mirrorClientPort: 8097
        pkt0TxBuffers: 1000
        restPort: 9091
```

```
      sandeshSendRateLimit: 0
      staleInterfaceCleanupTimeout: 60
      syslogFacility: LOG_LOCAL0
      tunnelType: MPLSoGRE
      vmiVMVnUveInterval: 30
      vrObjectHighWatermark: 80
      xmppAuthEnable: false
      xmppCaCert: /etc/contrail/ssl/certs/ca-cert.pem
      xmppServerCert: /etc/contrail/ssl/certs/server.pem
      xmppServerKey: /etc/contrail/ssl/private/server-privkey.pem
    sandesh:
      introspectSslEnable: false
      sandeshCaCert: /etc/contrail/ssl/certs/ca-cert.pem
      sandeshCertfile: /etc/contrail/ssl/certs/server.pem
      sandeshKeyfile: /etc/contrail/ssl/private/server-privkey.pem
      sandeshSslEnable: false
    virtualHostInterface:
      gateway: ""
      gateway6: ""
      ip: ""
      ip6: ""
  agentModeType: dpdk
  common:
    affinity:
      nodeAffinity:
        requiredDuringSchedulingIgnoredDuringExecution:
          nodeSelectorTerms:
          - matchExpressions:
            - key: node-role.kubernetes.io/master
              operator: Exists
    containers:
    - command:
      - sh
      - -c
      - sleep infinity
      image: svl-artifactory.site.net/blr-data-plane/contrail-vrouter-agent:jcnr-3594
      imagePullPolicy: IfNotPresent
      name: contrail-vrouter-agent
    - image: 10.108.29.153:5000/contrail-vrouter-dpdk:kr_jcnr_3556
      imagePullPolicy: IfNotPresent
      name: contrail-vrouter-agent-dpdk
      resources:
        limits:
          hugepages-1Gi: 4Gi
          memory: 4Gi
        requests:
          hugepages-1Gi: 4Gi
          memory: 4Gi
    - env:
      - name: TELEMETRY_EXPORTER_SCHEME
        value: http
      image: x.site.net/atom-docker/jcnr/deployer/contrail-telemetry-exporter:fix_load_module
      imagePullPolicy: IfNotPresent
      name: contrail-vrouter-telemetry-exporter
    initContainers:
    - image: x.site.net/atom-docker/jcnr/deployer/contrail-init:fix_load_module
      imagePullPolicy: IfNotPresent
      name: contrail-init
    - image: x.site.net/atom-docker/jcnr/deployer/contrail-vrouter-kernel-init-dpdk:fix_load_module
      imagePullPolicy: IfNotPresent
      name: contrail-vrouter-kernel-init-dpdk
    controlNodeInstance: contrail-control
    coreFilePath: /var/crash
    corePattern: /var/crashes/core.%e.%h.%t
    dpdk:
      cpuCoreMask: 2,3,4,5
      dpdkCommandAdditionalArgs: --yield_option 0
      dpdkCtrlThreadMask: ""
      dpdkUioDriver: vfio-pci
      hugePagesDir: /dev/hugepages
      l2TableAgeout: 300
      numServiceCtrlThreadCPU: 0
      serviceCoreMask: ""
    headlessMode: true
    installCni: false
    interfaceLayer: l3
    interfaces:
```

```
        - name: ens1f1
        - name: ens1f2
        - name: ens2f1
      logPath: /var/log/jcnr/
      metricsBindAddress: 127.0.0.1:18084
      qosEnable: false
      restoreInterfaces: false
    status:
      conditions:
      - lastTransitionTime: "2023-03-23T16:51:16Z"
        lastUpdateTime: "2023-03-23T16:51:16Z"
        name: contrail/contrail-vrouter-masters-configmap
        operation: Create
        reason: ServiceReady
        status: "True"
        type: ConfigMap
      - lastTransitionTime: "2023-03-23T16:51:16Z"
        lastUpdateTime: "2023-03-23T16:51:16Z"
        name: contrail/contrail-vrouter-masters
        operation: Create
        reason: ServiceReady
        status: "True"
        type: DaemonSet
      - lastTransitionTime: "2023-03-23T16:51:16Z"
        lastUpdateTime: "2023-03-23T16:51:16Z"
        name: contrail/contrail-vrouter-masters
        operation: StatusCheck
        reason: ServiceReady
        status: "True"
        type: DaemonSetStatus
      - lastTransitionTime: "2023-03-23T16:51:16Z"
        lastUpdateTime: "2023-03-23T16:51:16Z"
        name: contrail/contrail-vrouter-masters
        operation: Update
        reason: ServiceReady
        status: "True"
        type: Done
      controlDataAddress:
        x.englab.site.net: ""
      metadata: { }
      phase: Done
      status: "True"
kind: List
metadata:
  resource Version: ""
  selfLink: ""
```

An example manifest for a virtual router that includes configuration data for a virtual router custom resource and for probes as described above, and can be applied by virtual router job 652, is as follows:

```
apiVersion: v1
data:
  contrail-dpdk-headless-cr.yaml: |
    apiVersion: dataplane.site.net/v1alpha1
    kind: Vrouter
    metadata:
      name: contrail-vrouter-masters
      namespace: contrail
    spec:
      agent:
        default:
        common:
          containers:
          - name: "contrail-vrouter-agent"
            livenessProbe:
              httpGet:
                host: 127.0.0.1
                path: /vrouter-health-check
                port: 9091
              initialDelaySeconds: {{ .Values.livenessProbe.initialDelaySeconds }}
              periodSeconds: {{ .Values.livenessProbe.periodSeconds }}
              timeoutSeconds: {{ .Values.livenessProbe.timeoutSeconds }}
              failureThreshold: {{ .Values.livenessProbe.failureThreshold }}
              successThreshold: {{ .Values.livenessProbe.successThreshold }}
```

```
startupProbe:
  httpGet:
    host: 127.0.0.1
    path: /vrouter-health-check
    port: 9091
    initialDelaySeconds: {{ .Values.startupProbe.initialDelaySeconds }}
    periodSeconds: {{ .Values.startupProbe.periodSeconds }}
    timeoutSeconds: {{ .Values.startupProbe.timeoutSeconds }}
    failureThreshold: {{ .Values.startupProbe.failureThreshold }}
    successThreshold: {{ .Values.startupProbe.successThreshold }}
```

Example 1: A computing device includes processing circuitry in communication with a storage device, the processing circuitry configured to execute a container orchestration platform, wherein the container orchestration platform is configured to: create a virtual router custom resource instance of a virtual router custom resource definition, the virtual router custom resource instance for a virtual router to execute on the computing device, and based on configuration data for the virtual router custom resource instance, modify the virtual router custom resource instance with the configuration data and deploy a first virtual computing instance comprising a virtual router configured according to the modified virtual router custom resource instance; and wherein the processing circuitry is configured to execute the virtual router to process a packet.

Example 2: The computing device of example 1, wherein the container orchestration platform is configured to: create a custom resource for the virtual router custom resource definition, and receive the configuration data at the custom resource.

Example 3: The computing device of example 2, wherein the container orchestration platform is configured to: based on a request to deploy the virtual router, create a data plane deployer pod and a container orchestration platform job in the computing device, wherein the data plane deployer pod creates the custom resource for the virtual router custom resource definition, and wherein the container orchestration platform job, based on an indication the custom resource for the virtual router custom resource definition is available, creates the virtual router custom resource instance of the virtual router custom resource definition and modifies the virtual router custom resource instance with the configuration data.

Example 4: The computing device of any of examples 1 through 3, wherein the container orchestration platform is configured to deploy a second virtual computing instance to the computing device, and wherein the processing circuitry is configured to execute a container of the second virtual computing instance.

Example 5: The computing device of example 4, wherein the container comprises one of a distributed unit or a centralized unit for a radio access network of a mobile network.

Example 6: The computing device of any of examples 4 and 5, wherein the container orchestration platform is configured to: allocate, based on a request for an exclusive central processing unit (CPU) in a manifest for the first virtual computing instance, a first CPU to the first virtual computing instance to cause the first CPU to execute the virtual router; allocate, based on a request for an exclusive CPU in a manifest for the second virtual computing instance, a different, second CPU to the second virtual computing instance.

Example 7: The computing device of any of examples 4 through 6, wherein the configuration data for the virtual router custom resource instance specifies a central processing unit (CPU) to reserve for the virtual router, wherein the virtual router is configured to reserve, with the container orchestration platform, the specified CPU, and wherein the container orchestration platform is configured to exclude the specified CPU from a shared pool of CPUs allocable to other virtual computing instances to execute on the computing device.

Example 8: The computing device of any of examples 4 through 7, further includes a network interface card comprising a plurality of virtual functions offered using single root I/O virtualization (SR-IOV), the plurality of virtual functions comprising a first virtual function, wherein the configuration data for the virtual router custom resource instance specifies an interface name for the first virtual function, wherein a DPDK driver is configured to, based on the interface name, obtain a corresponding Peripheral Component Interface (PCI) identifier (ID) for the first virtual function, and wherein the virtual router is configured to obtain the PCI ID for the first virtual function and use the first virtual function for communications.

Example 9: The computing device of example 8, wherein the DPDK driver is configured to exclude the PCI ID from an SR-IOV configuration map for the network interface card to prevent the second computing instance from using the first virtual function of the network interface card.

Example 10: The computing device of any of examples 1 through 9, wherein virtual router is configured to implement an endpoint to expose an internal state of the virtual router, wherein the container orchestration platform is configured to: send a probe to the endpoint; and based on the probe, perform an action to reconfigure or restart the virtual router.

Example 11: A method includes creating, by a container orchestration platform executing on a computing device, a virtual router custom resource instance of a virtual router custom resource definition, the virtual router custom resource instance for a virtual router to execute on the computing device; based on configuration data for the virtual router custom resource instance, by the container orchestration platform, modifying the virtual router custom resource instance with the configuration data and deploying a first virtual computing instance comprising a virtual router configured according to the modified virtual router custom resource instance; and executing, by the computing device, the virtual router to process a packet.

Example 12: The method of example 11, further includes creating, by the container orchestration platform, a custom resource for the virtual router custom resource definition; and receiving the configuration data at the custom resource.

Example 13: The method of example 12, further includes based on a request to deploy the virtual router, by the container orchestration platform, creating a data plane deployer pod and a container orchestration platform job in the computing device; creating, by the data plane deployer pod, the custom resource for the virtual router custom resource definition; and based on an indication the custom resource for the virtual router custom resource definition is available, by the container orchestration platform job, creating the virtual router custom resource instance of the virtual router custom resource definition and modifying the virtual router custom resource instance with the configuration data.

Example 14: The method of any of examples 11 through 13, further includes deploying, by the container orchestration platform, a second virtual computing instance to the computing device; and executing, by the computing device, a container of the second virtual computing instance.

Example 15: The method of example 14, wherein the container comprises one of a distributed unit or a centralized unit for a radio access network of a mobile network.

Example 16: The method of any of examples 14 and 15, further includes allocating, by the container orchestration platform, based on a request for an exclusive central processing unit (CPU) in a manifest for the first virtual computing instance, a first CPU to the first virtual computing instance to cause the first CPU to execute the virtual router; allocating, by the container orchestration platform, based on a request for an exclusive CPU in a manifest for the second virtual computing instance, a different, second CPU to the second virtual computing instance.

Example 17: The method of any of examples 14 through 16, wherein the configuration data for the virtual router custom resource instance specifies a central processing unit (CPU) to reserve for the virtual router, the method further includes reserving, by the virtual router, with the container orchestration platform, the specified CPU; excluding, by the container orchestration platform, the specified CPU from a shared pool of CPUs allocable to other virtual computing instances to execute on the computing device.

Example 18: The method of any of examples 14 through 17, wherein a network interface card of the computing device comprises a plurality of virtual functions offered using single root I/O virtualization (SR-IOV), the plurality of virtual functions includes obtaining, by a DPDK driver, based on the interface name, a corresponding Peripheral Component Interface (PCI) identifier (ID) for the first virtual function; and obtaining, by the virtual router, the PCI ID for the first virtual function and using the first virtual function for communications.

Example 19: The method of example 18, further includes excluding, by the DPDK driver, the PCI ID from an SR-IOV configuration map for the network interface card to prevent the second computing instance from using the first virtual function of the network interface card.

Example 20: The method of any of examples 11 through 19, further includes implementing, by the virtual router, an endpoint to expose an internal state of the virtual router; and by the container orchestration platform: sending a probe to the endpoint; and based on the probe, performing an action to reconfigure or restart the virtual router. Example 21: A non-transitory computer readable storage medium includes execute a container orchestration platform; create, by a container orchestration platform, a virtual router custom resource instance of a virtual router custom resource definition, the virtual router custom resource instance for a virtual router to execute on the computing device; based on configuration data for the virtual router custom resource instance, by the container orchestration platform, modify the virtual router custom resource instance with the configuration data and deploying a first virtual computing instance comprising a virtual router configured according to the modified virtual router custom resource instance; and execute the virtual router to process a packet.

What is claimed is:

1. A computing device comprising:
processing circuitry in communication with a storage device, the processing circuitry configured to execute a container orchestration platform, wherein the container orchestration platform is configured to:
  create a virtual router custom resource instance of a virtual router custom resource definition, the virtual router custom resource instance for a virtual router to execute on the computing device;
  based on configuration data for the virtual router custom resource instance, modify the virtual router custom resource instance with the configuration data and deploy a first virtual computing instance comprising a virtual router configured according to the modified virtual router custom resource instance;
  deploy a second virtual computing instance to the computing device; and
  allocate, based on the configuration data for the virtual router custom resource instance, instances of at least one resource of the computing device between the first virtual computing instance and the second virtual computing instance, wherein the at least one resource of the computing device comprises one or more of a central processing unit (CPU) or a virtual function of a network interface card and offered using single root I/O virtualization (SR-IOV);
wherein the processing circuitry is configured to execute the virtual router to process a packet, and
wherein the processing circuitry is configured to execute a container of the second virtual computing instance.

2. The computing device of claim 1, wherein the container comprises one of a distributed unit or a centralized unit for a radio access network of a mobile network.

3. The computing device of claim 1, wherein to allocate the instances of at least one resource of the computing device, the container orchestration platform is configured to:
  allocate, based on a first request for an exclusive CPU in a manifest for the first virtual computing instance, a first CPU to the first virtual computing instance to cause the first CPU to execute the virtual router; and
  allocate, based on a second request for an exclusive CPU in a manifest for the second virtual computing instance, a different, second CPU to the second virtual computing instance.

4. The computing device of claim 1,
wherein the configuration data for the virtual router custom resource instance specifies a CPU to reserve for the virtual router,
wherein the virtual router is configured to reserve, with the container orchestration platform, the specified CPU, and
wherein to allocate the instances of the at least one resource of the computing device, the container orchestration platform is configured to exclude the specified CPU from a shared pool of CPUs allocable to other virtual computing instances to execute on the computing device.

5. The computing device of claim 1, further comprising:
the network interface card, wherein the network interface card comprises a plurality of virtual functions offered using SR-IOV, the plurality of virtual functions comprising the virtual function, wherein the configuration data for the virtual router custom resource instance specifies an interface name for the virtual function, wherein a data plane development kit (DPDK) driver is configured to, based on the interface name, obtain a corresponding Peripheral Component Interface (PCI) identifier (ID) for the virtual function, and wherein the virtual router is configured to obtain the PCI ID for the virtual function and use the virtual function for communications.

6. The computing device of claim 5, wherein the DPDK driver is configured to exclude the PCI ID from an SR-IOV configuration map for the network interface card to prevent the second computing instance from using the virtual function of the network interface card.

7. The computing device of claim 1, wherein virtual router is configured to implement an endpoint to expose an internal state of the virtual router, and wherein the container orchestration platform is configured to:
 send a probe to the endpoint; and
 based on the probe, perform an action to reconfigure or restart the virtual router.

8. A method comprising:

creating, by a container orchestration platform executing on a computing device, a virtual router custom resource instance of a virtual router custom resource definition, the virtual router custom resource instance for a virtual router to execute on the computing device;

based on configuration data for the virtual router custom resource instance, by the container orchestration platform, modifying the virtual router custom resource instance with the configuration data and deploying a first virtual computing instance comprising a virtual router configured according to the modified virtual router custom resource instance;

deploying, by the container orchestration platform, a second virtual computing instance to the computing device;

allocating, by the container orchestration platform, based on the configuration data for the virtual router custom resource instance, instances of at least one resource of the computing device between the first virtual computing instance and the second virtual computing instance, wherein the at least one resource of the computing device comprises one or more of a central processing unit (CPU) or a virtual function of a network interface card and offered using single root I/O virtualization (SR-IOV);

executing, by the computing device, the virtual router to process a packet; and executing, by the computing device, a container of the second virtual computing instance.

9. The method of claim 8, wherein the container comprises one of a distributed unit or a centralized unit for a radio access network of a mobile network.

10. The method of claim 8, wherein allocating the instances of at least one resource of the computing device comprises:

allocating, based on a first request for an exclusive CPU in a manifest for the first virtual computing instance, a first CPU to the first virtual computing instance to cause the first CPU to execute the virtual router; and allocating, based on a second request for an exclusive CPU in a manifest for the second virtual computing instance, a different, second CPU to the second virtual computing instance.

11. The method of claim 8, wherein the configuration data for the virtual router custom resource instance specifies a CPU to reserve for the virtual router, the method further comprising:

reserving, by the virtual router, with the container orchestration platform, the specified CPU; and excluding, by the container orchestration platform, the specified CPU from a shared pool of CPUs allocable to other virtual computing instances to execute on the computing device.

12. The method of claim 8, wherein a network interface card of the computing device comprises a plurality of virtual functions offered using SR-IOV, the plurality of virtual functions comprising the virtual function, wherein the configuration data for the virtual router custom resource instance specifies an interface name for the virtual function, the method further comprising:

obtaining, by a data plane development kit (DPDK) driver, based on the interface name, a corresponding Peripheral Component Interface (PCI) identifier (ID) for the virtual function; and obtaining, by the virtual router, the PCI ID for the virtual function and using the virtual function for communications.

13. The method of claim 12, further comprising:

excluding, by the DPDK driver, the PCI ID from an SR-IOV configuration map for the network interface card to prevent the second computing instance from using the virtual function of the network interface card.

14. The method of claim 8, further comprising:

implementing, by the virtual router, an endpoint to expose an internal state of the virtual router; and by the container orchestration platform:
 sending a probe to the endpoint; and
 based on the probe, performing an action to reconfigure or restart the virtual router.

15. Non-transitory computer readable storage media comprising instructions for causing processing circuitry of a computing device to:

execute a container orchestration platform;

create, by a container orchestration platform, a virtual router custom resource instance of a virtual router custom resource definition, the virtual router custom resource instance for a virtual router to execute on the computing device;

deploy, by the container orchestration platform, a second virtual computing instance to the computing device;

allocate, based on the configuration data for the virtual router custom resource instance, instances of at least one resource of the computing device between the first virtual computing instance and the second virtual computing instance, wherein the at least one resource of the computing device comprises one or more of a central processing unit (CPU) or a virtual function of a network interface card and offered using single root I/O virtualization (SR-IOV);

execute the virtual router to process a packet; and execute a container of the second virtual computing instance.

16. The non-transitory computer readable storage media of claim 15, wherein the container comprises one of a distributed unit or a centralized unit for a radio access network of a mobile network.

17. The non-transitory computer readable storage media of claim 15, wherein to allocate the instances of at least one resource of the computing device, the instructions cause the processing circuitry of the computing device to:
   allocate, based on a first request for an exclusive CPU in a manifest for the first virtual computing instance, a first CPU to the first virtual computing instance to cause the first CPU to execute the virtual router; and
   allocate, based on a second request for an exclusive CPU in a manifest for the second virtual computing instance, a different, second CPU to the second virtual computing instance.

18. The non-transitory computer readable storage media of claim 15,
   wherein the configuration data for the virtual router custom resource instance specifies a CPU to reserve for the virtual router, and
   wherein the instructions cause the processing circuitry of the computing device to:
      reserve, by the virtual router, with the container orchestration platform, the specified CPU; and
      exclude, by the container orchestration platform, the specified CPU from a shared pool of CPUs allocable to other virtual computing instances to execute on the computing device.

19. The non-transitory computer readable storage media of claim 15,
   wherein a network interface card of the computing device comprises a plurality of virtual functions offered using SR-IOV, the plurality of virtual functions comprising the virtual function,
   wherein the configuration data for the virtual router custom resource instance specifies an interface name for the virtual function, and
   wherein the instructions cause the processing circuitry of the computing device to:
      obtain, by a data plane development kit (DPDK) driver, based on the interface name, a corresponding Peripheral Component Interface (PCI) identifier (ID) for the virtual function; and
      obtain, by the virtual router, the PCI ID for the virtual function and using the virtual function for communications.

20. The non-transitory computer readable storage media of claim 19, wherein the instructions cause the processing circuitry of the computing device to:
   exclude, by the DPDK driver, the PCI ID from an SR-IOV configuration map for the network interface card to prevent the second computing instance from using the virtual function of the network interface card.

* * * * *